United States Patent [19]

Tani et al.

[11] Patent Number: 5,568,458
[45] Date of Patent: Oct. 22, 1996

[54] OPTICAL INFORMATION RECORDING AND REPRODUCING APPARATUS IN WHICH REPRODUCING LIGHT IS USED TO PERFORM SERVO CONTROL HAVING NO OFFSET AT RECORDING MODE

[75] Inventors: Naoaki Tani; Takumi Sugaya, both of Hachioji; Takao Rokutan, Higashimurayama; Mitsuo Oshiba, Hachioji; Takefumi Sakurada, Akishima, all of Japan

[73] Assignee: Olympus Optical Co., Ltd., Tokyo, Japan

[21] Appl. No.: 100,160

[22] Filed: Aug. 2, 1993

[30] Foreign Application Priority Data

Aug. 10, 1992 [JP] Japan .................................. 4-212968

[51] Int. Cl.$^6$ ................................................ G11B 7/09
[52] U.S. Cl. ................................ 369/44.35; 369/44.29; 369/44.32; 369/44.34; 369/44.38; 369/116
[58] Field of Search .......................... 369/44.27, 44.37, 369/44.38, 44.41, 44.34, 44.32, 116, 44.28, 44.36, 44.25, 54, 58; 235/454, 456

[56] References Cited

U.S. PATENT DOCUMENTS

| | | | |
|---|---|---|---|
| 4,459,690 | 7/1984 | Corsover et al. | 369/44.38 |
| 5,150,347 | 9/1992 | Yanagi | 369/44.29 |
| 5,153,871 | 10/1992 | Minakuchi | 369/116 |
| 5,197,058 | 3/1993 | Bell, Jr. et al. | 369/44.28 |
| 5,222,055 | 6/1993 | Fujita | 369/44.32 |
| 5,247,504 | 9/1993 | Akatsuka | 369/44.38 |
| 5,293,366 | 3/1994 | Ohta | 369/44.38 |
| 5,339,300 | 8/1994 | Akatsuka et al. | 369/44.29 |
| 5,367,512 | 11/1994 | Satou et al. | 369/44.38 |

FOREIGN PATENT DOCUMENTS 2-61830  3/1990  Japan .
4-82028  3/1992  Japan .

Primary Examiner—Georgia Y. Epps
Assistant Examiner—P. W. Huber

[57] ABSTRACT

An optical information recording and reproducing apparatus comprising a first and a second laser diodes for generating recording light and reproducing light, respectively. A light emission condition of the second laser diode is always controlled to the constant or predetermined light intensity which is adequate for reproduction, by an APC circuit. The first laser diode is controlled by a light-intensity control circuit so as to be brought to the intensity of light emission lower than a level which forms a pit on an optical card, in a reproducing mode other than a period of time of a recording mode. Under a focus and tracking control due to the reproducing light, a value of a focus error and a value of a tracking error due to the recording light at a low level are detected and sampled/held as a focus offset and a tracking offset. During a period of time of the recoding mode, focus control and tracking control due to the reproducing light are performed so that these offsets are brought to zero.

4 Claims, 11 Drawing Sheets

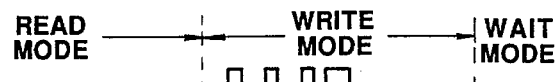
FIG.10a 51 LD(W)
FIG.10b 58 LD(R)
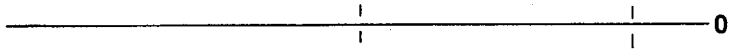
FIG.10c OUTPUT OF 79
FIG.10d SS
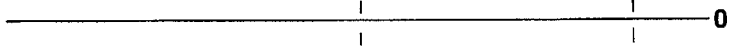
FIG.10e CS
FIG.10f S1, S2(S3)   a:ON   b:ON   a:ON
FIG.10g FE(R)
FIG.10h FE(W)   Vf
FIG.10i OUTPUT OF 92
FIG.10j SW   ON   OFF   ON
FIG.10k SINE WAVE
FIG.10l SS2
FIG.10m TE(W)   Vt
FIG.10n TE(R)
FIG.10o OUTPUT OF 144

OPTICAL INFORMATION RECORDING AND REPRODUCING APPARATUS IN WHICH REPRODUCING LIGHT IS USED TO PERFORM SERVO CONTROL HAVING NO OFFSET AT RECORDING MODE

BACKGROUND OF THE INVENTION

1. Field of the Invention

The present invention relates to an optical information recording and reproducing apparatus which comprises a light source for generating recording light and a light source for generating reproducing light, which are different from each other, and in which a quantity of shift or offset of servo conditions on the basis of both of the lights is dissolved so that the reproducing light is used to perform the servo control at a recording mode.

2. Related Art

In an optical information recording and reproducing apparatus in which information is optically recorded and reproduced with respect to an optical recording medium such as an optical card or the like, a light source for generating recording light and a light source for generating reproducing light are separately provided, and an optical information recording and reproducing apparatus of a two-light-source system has been proposed in which verifying operation is performed which confirms recorded information by a reproducing light spot immediately after recording to increase effective recording speed, as an arrangement in which a single track is illuminated by two optical spots including a recording light spot and a reproducing light spot to simultaneously perform recording and reproducing.

As the optical information recording and reproducing apparatus of the two-light-source system, there are a prior art disclosed in Japanese Patent Laid-Open No. HEI 2-61830 (61830/1990) and a related technical art example disclosed in Japanese Patent Laid-Open No. HEI 4-82028 (82028/1992), for example.

Any one of these optical information recording and reproducing apparatuses is so arranged as to perform track control and focus control by the reproducing light. Further, in a photo detector for detecting a reproducing signal, a focus detecting signal and a track detecting signal on the basis of a change or variation In the reproducing light, the photo detector is so arranged as not to receive the recording light.

For example, an optical system 150 of the apparatus disclosed in Japanese Patent Laid-Open No. HEI 2-61830 (61830/1990), as shown in FIG. 1 of the attached drawings, is arranged as follows. That is, a polarizing direction is set such that recording light is generated from a recording light source 151, and the recording light reflected by an optical card 164 is transmitted through a reflecting surface of a polarization beam splitter 157. Accordingly, the recording light is not incident upon a pair of photo detectors 153 and 154.

That is, the recording light generated from the semiconductor laser 151 is brought substantially to elliptic parallel light by a collimating lens 155. After only a minor-axis direction of the ellipse is enlarged by a shaping prism 156 so that the parallel light is shaped substantially to a circular form, and is incident upon the reflecting surface of the polarization beam splitter 157 substantially at P-polarization. Accordingly, almost all of the parallel light is transmitted so that the parallel light proceeds on an optical axis of an objective lens 158 on a center of a beam. The parallel light is condensed onto the optical card 164 so that an optical spot of the recording light is formed. Light reflected from the optical card 164 is returned to a direction opposite to the incidence. That is, the light is condensed by the objective lens 158, is transmitted through the polarization beam splitter 157, and is returned to the side of the shaping prism 156.

On the other hand, reproducing light generated from an end-face light emitting diode 152 which is brought to a reproducing light source is brought to parallel light by a collimating lens 159. The parallel light is such that only an S-polarization component is reflected by the polarization beam splitter 157. The reflected light is incident upon a position which is out of the optical axis of the objective lens 158, and is converged or condensed onto the optical card 164 to focus into a slit-like image as an image on a light emitting surface of the end-face light emitting diode 152. The light reflected by the optical card 164 passes through the objective lens 158, and is reflected by the polarization beam splitter 157. Subsequently, the light passes through a mirror 160, an imaging lens 161 and a mirror 162, and is guided to a half mirror 163. A part of the light is transmitted through the half mirror 163, and reaches one of the photo detectors 153. The remaining part of the light is reflected by the half mirror 163, and reaches the other photo detector 154.

Further, an optical system 170 of the apparatus disclosed in Japanese Patent Laid-Open No. HEI 4-82028 (82028/1992) and illustrated in FIG. 2 is arranged as follows. That is, recording light generated from a recording light source 172 and reproducing light generated from a reproducing light source 171 are differentiated in wavelength from each other. Although the recording light and the reproducing light reflected by an optical card 164 are incident upon a toric lens 192 for focus detection, only the reproducing light is transmitted through a dielectric multi-layer film or membrane having wavelength selection permeability formed on a lens surface, and the recording light is reflected. Accordingly, the recording light is not incident upon a photo detector 173.

The recording light having wavelength of 830 nm generated by the recording light source 172 is differentiated in wavelength from the reproducing light having wavelength of 780 nm generated by the reproducing light source 171. The recording light and the reproducing light are modified or corrected respectively to parallel lights by collimate lenses 174 and 191. The reproducing light is further divided into three lights (0 (zero)-order light and ± primary diffracted lights) by a diffraction grating 175, which are incident upon a dichroic prism 176.

The recording light and the reproducing light which are composed by the dichroic prism 176 are shaped by a shaping prism 177 and, subsequently, are transmitted through a polarization beam splitter 178. The recording light and the reproducing light are converted to circular polarization of light by a ¼-wavelength plate 179 and are focused by an objective lens 190 to form respective optical spots on the optical card 164. The recording light and the reproducing light are reflected by the optical card 164 and, subsequently, are transmitted through the objective lens 190 in an opposite direction. The recording light and the reproducing light are brought respectively to lights by the ¼-wavelength plate 179, in which a polarization direction is rotated through 90° with respect to the incident time. The lights are reflected by the polarization beam splitter 178 and are incident upon the toric lens 192 for focus detection.

However, the arrangement is as follows. That is, since the dielectric multi-layer membrane of wavelength selection transparency is formed on the surface of the lens 192, only the reproducing light having the wavelength of 780 nm is transmitted, and the recording light having the wavelength of 830 nm is reflected. Accordingly, the recording light is not incident upon the detector 173.

Accordingly, the optical information recording and reproducing apparatus such as the prior art which is separately provided with the light source for generating the recording light and the light source for generating the reproducing light is arranged such that the recording light is not received by the photo detector. Thus, there is no necessity of the recording light other than the time of recording operation, and the recording light is not irradiated on an optical recording medium other than the time of recording operation.

The following problems are considered in such optical information recording and reproducing apparatuses.

1. In the prior art or the like, since the semiconductor laser 151 or the like for emitting the recording light upon the time of recording operation which performs recording of information onto the optical recording medium is brought to a light-emitting condition, transient affection or influence of light emission characteristic of the semiconductor laser 151 is apt to be come under during a period of time in the vicinity of start of the recording operation so that formation of a uniform pit becomes difficult.
2. In the arrangement of the prior art example or the like, the recording light is arranged so as not to be detected by the photo detector, and the focus control is performed only by the reproducing light. Accordingly, if optical regulating shift or offset is generated by a change with the passage of time and a temperature change, the recording optical spot is brought to a focus shift or offset condition. Thus, the possibility is generated in which it is impossible to accurately record information to be recorded.

That is, since the size of the optical spot increases under a defocus condition, an energy density thereof decreases (less than a case of a focus condition). Thus, there is possibility that the pit cannot surely be formed.

3. In the arrangement of the prior art example or the like, there is a possibility that recording of the information is performed under a condition of tracking offset in which the recording light spot is offset from a central position in a width of each of the tracks. In this case, in a case where the recorded information is reproduced, it becomes difficult to surely detect the pit. Thus, it is expected that probability of generation of an error of reading increases.

SUMMARY OF THE INVENTION

It is an object of the invention to provide an optical information recording and reproducing apparatus which is capable of performing recording of information with a uniform pit.

It is an another object of the invention to provide an optical information recording and reproducing apparatus which can surely record information upon recording of the information, even if a change with the passage of time, a temperature change and the like are generated.

It is a still another object of the invention to provide an optical information recording and reproducing apparatus which can surely reproduce recorded information.

According to the invention, there is provided an optical information recording and reproducing apparatus comprising:

recording-light generating means for generating recording light which is used to record information onto an optical recording medium having a plurality of information tracks;

reproducing-light generating means for generating reproducing light which is used to reproduce the information recorded onto the optical recording medium;

an objective optical system for condensing and irradiating the recording light generated by the recording-light generating means and the reproducing light generated by the reproducing-light generating means, to positions on the optical recording medium different from each other;

optical detecting means for receiving reflected light of the recording light and reflected light of the reproducing light condensed and irradiated on the positions on the optical recording medium different from each other, at positions different from each other; and light-intensity control means for performing such control as to set the light intensity of the recording light generated by the recording-light generating means to the low light intensity in which a pit is not formed on the optical recording medium, during a period of time other than the time of the recording in which the information is recorded onto the optical recording medium.

With the above arrangement of the invention, the recording-light generating means can already be set to a steady state upon recording operation and, thus formation of the uniform pit is made possible by an increase in the light intensity of the recording light without affection upon a transient characteristic.

Moreover, means for dissolving relative focus and tracking offset is provided whereby servo control is performed by the use of the reproducing light. A focus condition and a tracking condition, which are less in offset, are held to enable the information to be recorded.

BRIEF DESCRIPTION OF THE DRAWINGS

FIG. 3 to FIG. 10o relate to a first embodiment of the invention, FIG. 3 being an entire arrangement view showing an optical information recording and reproducing apparatus according to the first embodiment of the invention;

FIG. 4 is a view for explanation, showing an optical card;

FIG. 5 is an arrangement view showing an optical system illustrated in FIG. 3;

FIG. 6 is a view for explanation, showing in enlargement a portion of the optical card;

FIG. 7 is a circuit view showing an APC circuit with respect to a reproducing laser diode;

FIG. 8 is a circuit view showing a light-intensity control circuit with respect to a recording laser diode;

FIG. 9 is an arrangement view showing a structure of a light receiving surface of a photo detector and an error-signal generating circuit;

FIGS. 10a to 10o are timing charts for description of operation of the first embodiment;

FIG. 12 is a view for explanation showing, in enlargement, a portion of an optical card;

FIG. 13 is an arrangement view showing a structure of a light receiving surface of a photo detector and a circuit arrangement of an error-signal generating circuit and the like;

FIG. 14 to FIG. 16 relates to a third embodiment of the invention, FIG. 14 being an arrangement view of an optical information recording and reproducing apparatus according to the third embodiment of the invention;

FIG. 15b is a cross-sectional view taken along a line B—B in FIG. 15a;

FIG. 16 is an arrangement view showing a structure of a light receiving surface of a photo detector and a circuit arrangement of an error-signal generating circuit or the like.

DETAILED DESCRIPTION OF THE PREFERRED EMBODIMENTS

A first embodiment of the invention is so characterized as to be provided with a mechanism for always irradiating recording light at a low level also during a period of time other than recording operation in which information is optically recorded onto an optical recording medium, to form a uniform pit without being subject to transient influence at the recording operation, and means for dissolving relative focus offset.

Figure 1:
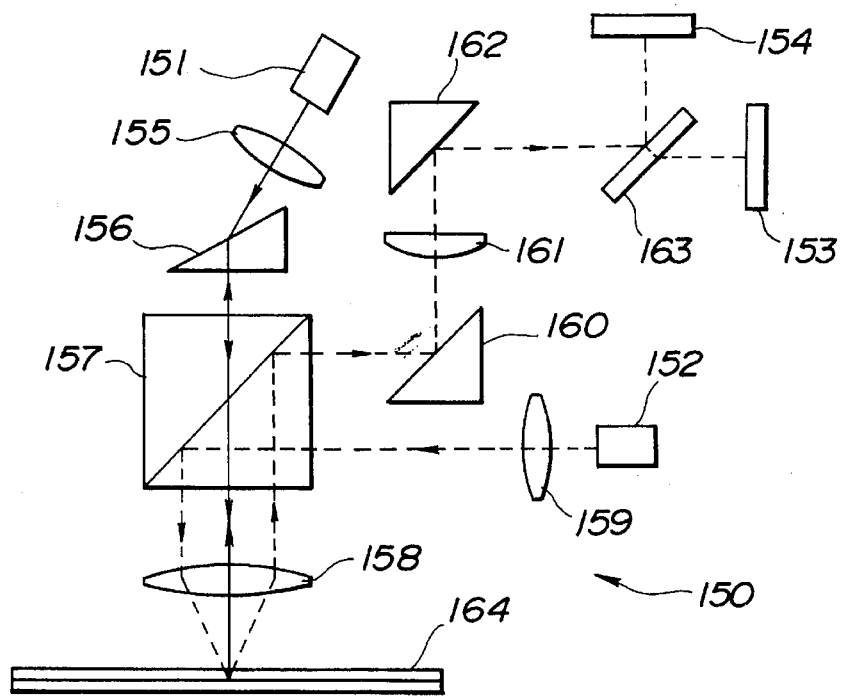
FIG. 1 is an arrangement view showing an optical system of a prior art example.
Figure 2:
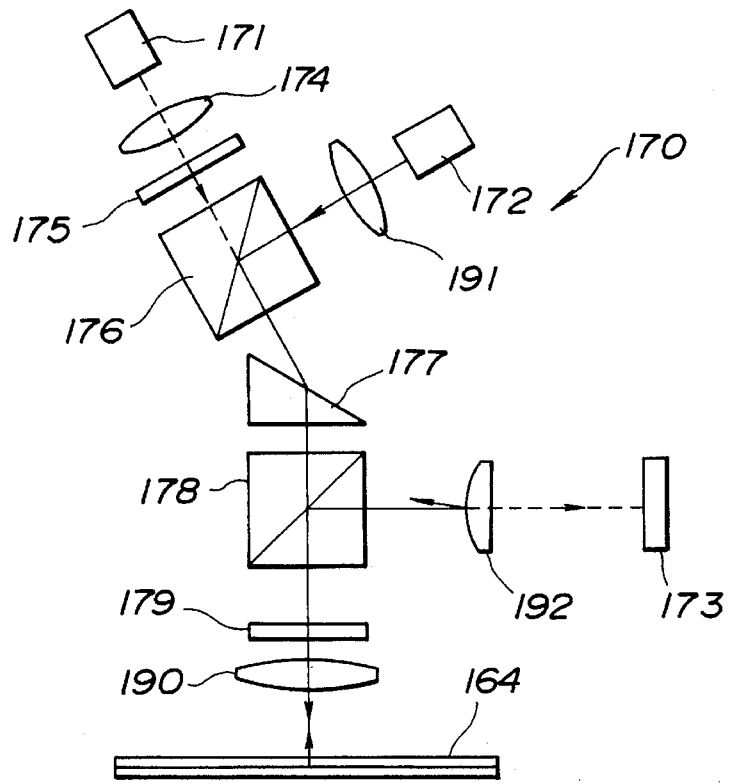
FIG. 2 is an arrangement view showing an optical system of a related art example.
Figure 3:
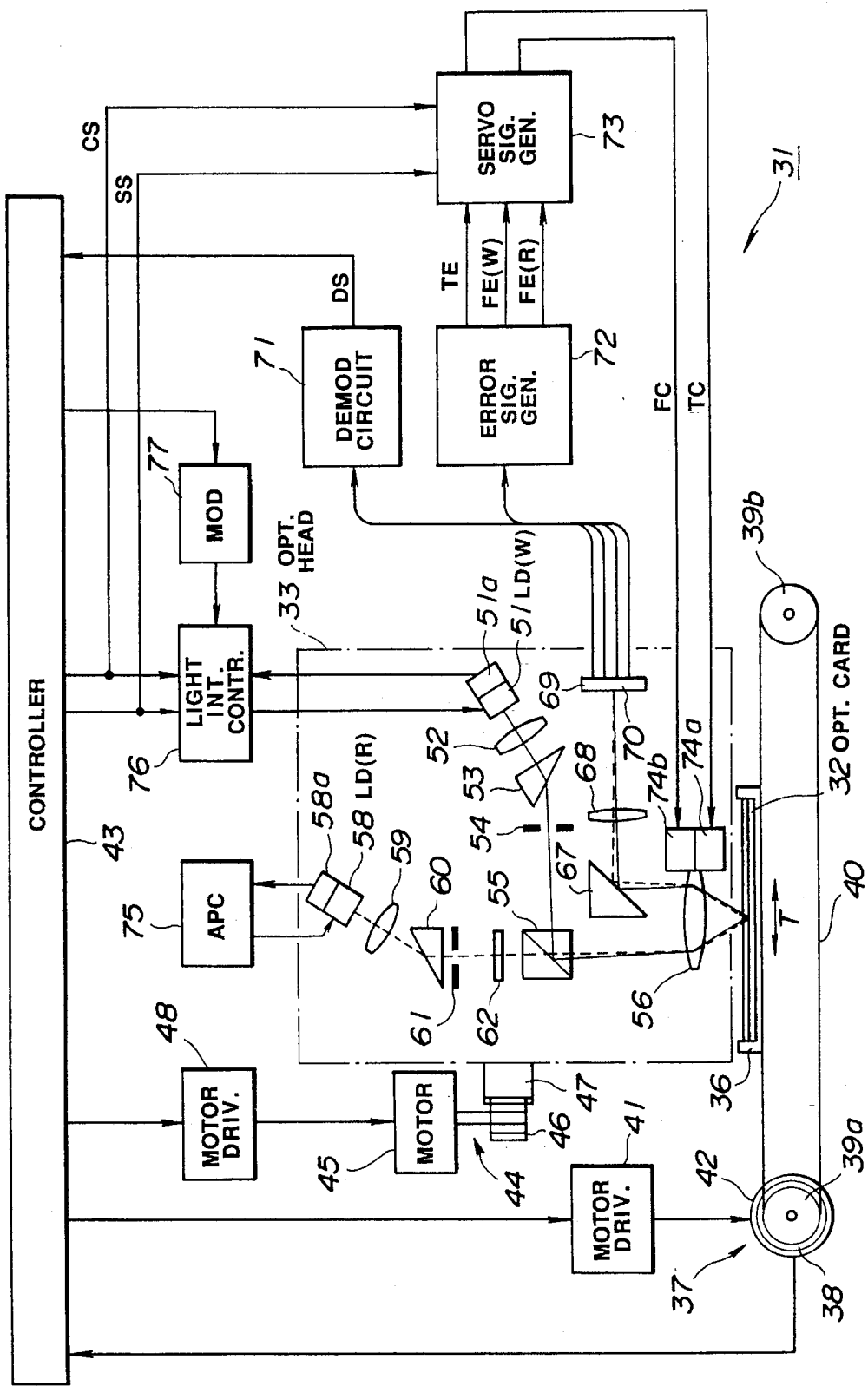

As shown in FIG. 3, an optical information recording and reproducing (playback) apparatus 31 according to the first embodiment of the invention comprises an optical head 33 which is arranged in opposed relation to an optical card 32 serving as an optical information recording medium.

Figure 4:
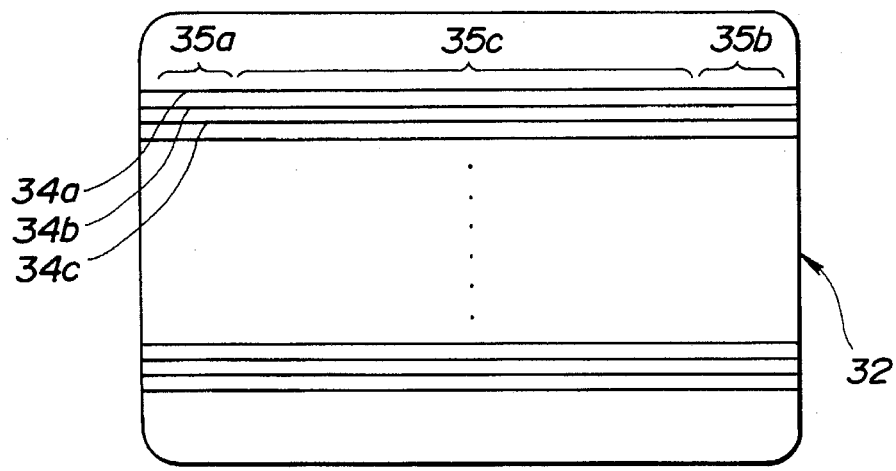

As shown in FIG. 4, the optical card 32 is formed with a plurality of rectilinear tracks 34a, 34b, 34c, . . . in a longitudinal direction of the optical card 32. Each of the tracks 34i (i=a, b, . . . ) has both ends thereof which are provided respectively with ID sections 35a and 35b on which track numbers of the track 34i are recorded respectively. A data section 35c in which information is optically recorded is formed between these ID sections 35a and 35b.

In the data section 35c, an optical spot having large light emitting strength (energy density) is Irradiated from the optical head 33, to thereby melt thermally a recording film or membrane at a portion at which the optical spot is irradiated, to form a pit, whereby recording of the information is performed. That is, a reflection factor changes with respect to a portion in which there is the recording film and a portion in which there is no recording film. Accordingly, a reproducing optical spot is irradiated, and a signal level corresponding to a light-intensity level of returned light (reflected light) thereof is binary-coded whereby it is possible to detect presence and absence of the pit, that is, binary-coded information recorded onto the tracks 34i.

Further, each of the tracks 34i is divided into a plurality of sectors. Management of the position where the information is recorded is performed by a sector unit.

In FIG. 3, the optical card 32 is mounted on an optical-card retaining or holding table 36, by a loading mechanism (not shown). The optical card 32 rests on a predetermined mounting position where recording/reproducing is performed, in an optical-card feed mechanism 37, together with the optical-card holding table 36.

The optical-card feed mechanism 37 comprises a driving motor 38, one of a pair of rollers 39a mounted on a rotary shaft of the driving motor 38, the other roller 39b arranged in spaced relation to the roller 39a, and a belt 40 passing round these rollers 39a and 39b. A positive drive signal for rotating the motor 38 in a clockwise direction through a motor drive circuit 41 is applied whereby the optical card 32 is carried to the right in a horizontal direction together with the optical-card holding table 36.

Furthermore, a negative drive signal is applied to the motor 38, whereby the optical card 32 is carried to the left in the horizontal direction together with the optical-card holding table 36. A quantity of carrying the optical card 32 is detected by a rotary encoder 42 which is mounted on the rotary shaft of the motor 38.

A direction in which the optical card 32 is carried is in parallel with a longitudinal direction of the optical card 32. Accordingly, a direction in which the optical card 32 is carried is in parallel with a direction (refer also to as "a track direction") $\underline{T}$ in which tracks 32a extend linearly.

The optical-card feed mechanism 37 is controlled by a controller 43.

The optical head 33 is arranged in opposed relation to the optical card 32 which rests on the optical-card feed mechanism 37. The optical head 33 is movable in a track transverse direction (a direction perpendicular to a sheet surface in FIG. 3) which extends perpendicularly to the track direction $\underline{T}$ by a head feed mechanism 44. The arrangement is such that the optical head 33 is moved in a track transverse direction by the head feed mechanism 44, whereby it is possible to access to optional tracks.

The head feed mechanism 44 comprises a driving motor 45, a gear 46 mounted on a rotary shaft of the driving motor 45, and a rack 47 in mesh with the gear 46 and mounted on a frame of the optical head 33. Positive and negative drive signals are supplied to the motor 45 from a motor drive circuit 48 so that the optical head 33 is moved in directions opposite to each other, in accordance with the positive and negative drive signals. The head feed mechanism 44 is also controlled by the controller 43.

Figure 5:
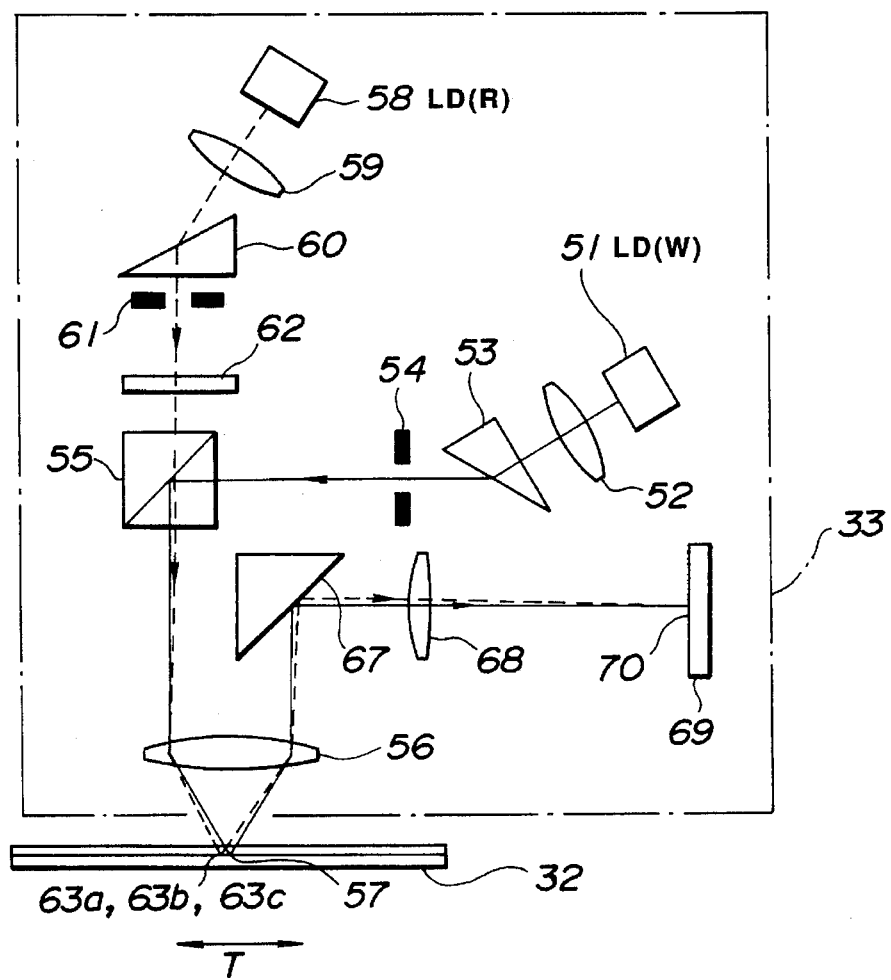

As shown in FIG. 5, recording light which is generated by a recording laser diode (referred to as "LD(W)" in the figure) 51 arranged within the optical head 33 is brought to substantially elliptic parallel light by a collimate lens 52. Only a major-axis direction of the ellipse is reduced at a shaping prism 53 so as to be shaped substantially into a circular form. Further, a diameter of the parallel light is restricted such that size of the recording optical spot is brought to a predetermined value by a restriction or stop 54. The parallel light is so set as to be incident upon a reflecting surface of a polarization beam splitter 55 substantially at $\underline{S}$-polarization.

Substantially all of the parallel light is reflected by the reflecting surface of the polarization beam splitter 55 so as to be incident upon a position offset or eccentric from an optical axis of an objective lens 56. The parallel light is condensed upon the optical card 32 and is brought to a recording optical spot 57.

On the other hand, the reproducing light brings a reproducing laser diode (referred to as "LD(R)" in the figure) 58 which is provided separately from the recording laser diode 51, to a light source, and is brought to substantially elliptic parallel light by a collimate lens 59. In the parallel light, only a minor-axis direction of the ellipse is enlarged by a shaping prism 60 so that the parallel light is shaped substantially into a circular form and, subsequently, a diameter of the parallel light is restricted or reduced such that size of the reproducing optical spot is brought to a predetermined value by a stop 61. Subsequently, the reproducing light is incident upon a diffraction grating 62, and is divided into three lights including 0 (zero)-order light and ± primary diffracted lights.

These three (3) reproducing lights are so set as to be incident upon the reflecting surface of the polarization beam splitter 55 substantially at the P-polarization. Almost all of the three reproducing lights are so transmitted as to be incident upon a position eccentric from an optical axis of the objective lens 56. The three reproducing lights are condensed onto the optical card 32 so as to be brought to an optical spot 63a due to 0 (zero)-order light of the reproducing light and optical spots 63b and 63c due respectively to the ± primary diffracted lights.

Figure 6:
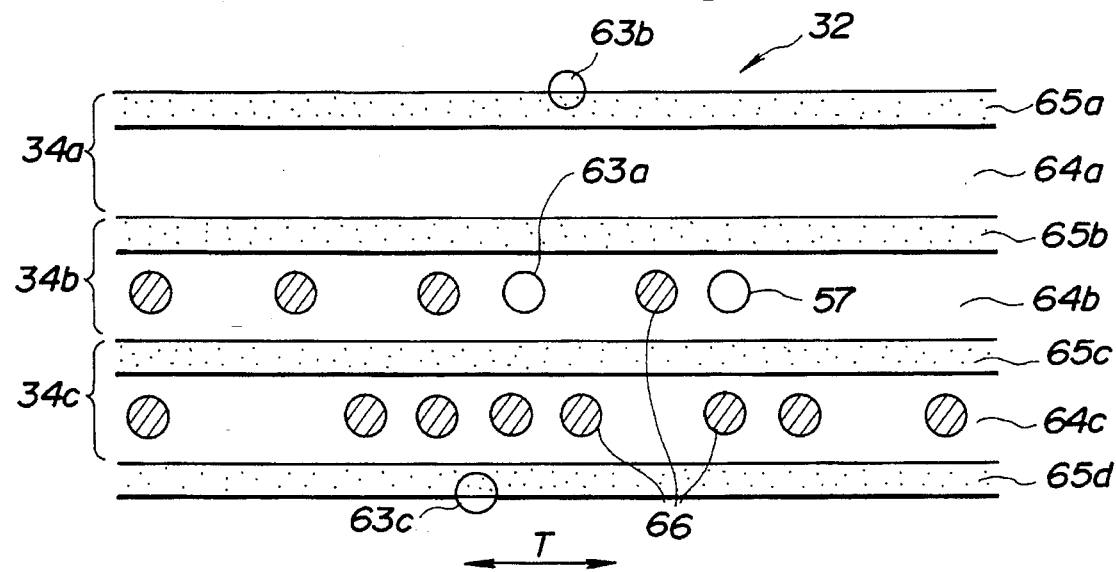

FIG. 6 is a view showing that a portion of the optical card 32 is enlarged, and that an aspect of the track 341 and an aspect of the optical spot are explained or described.

A plurality of guide tracks 65a, 65b, 65c and 65d different in reflection factor from the data tracks are formed on the optical card 32 at locations between the data tracks 64a, 64b and 64c.

Further, pits 66, 66 . . . are formed on the data tracks 64b and 64c, for example, by the optical head 33, for example. Data (information) are recorded by formation of these pits 66, 66, . . . .

A minute angular difference is relatively given to an optical axis of the recording light and an optical axis of the reproducing light which are incident upon the objective lens 56 by an optical arrangement illustrated in FIG. 5. Accordingly, when the recording optical spot 57 is formed on, for example, the data track 64b, the optical spot 63a due to the 0 (zero)-order light of the reproducing light is formed at a position slightly spaced away on the same data track 64b. Moreover, the optical spots 63b and 63c due respectively to the ± primary diffracted lights of the reproducing light are formed such that a portion of the optical spot is covered onto the guide tracks 65a and 65b.

On the other hand, the recording light and the three (3) reproducing lights which are reflected on the optical card 32 pass again through the objective lens 56 in the opposite direction, and are reflected by a mirror 67. Subsequently, the recording light and the three (3) reproducing lights are condensed by an imaging lens 68 to form an image of the recording optical spot 57, an image of the optical spot 63a due to the 0 (zero)-order light of the reproducing light, and images of the optical spots 63b and 63c due respectively to the ± primary diffracted lights on a light receiving surface 70 of a photo detector 69.

As shown in FIG. 3, an output from the photo detector 69 is inputted to a demodulation circuit 71 so that a demodulated demodulation signal DS is generated and is outputted to the controller 43. The controller 43 transmits the demodulation signal DS to the side of a high-order controller such as a computer or the like (not shown).

Furthermore, the output from the photo detector 69 is inputted to an error-signal generating circuit 72 to generate a tracking error signal TE on the basis of the reproducing light and focus error signals FE(W) and FE(R) respectively on the basis of the recording light and the reproducing light.

The tracking error signal TE expresses a signal corresponding to a quantity of displacement from a tracking condition in which the optical spot formed on each of the tracks is located at a center in a widthwise direction of each of the tracks. Under a condition set correctly, in a case where the signal TE is 0, the optical spot is located at the center in the widthwise direction of each of the tracks. In a case where the signal TE is positive and negative, the optical spot is formed at a position displaced from the center in the widthwise direction of each of the tracks.

The focus error signals FE(W) and FE(R) are signals corresponding to a quantity of displacement from a focus condition under which size of the optical spot formed on the optical card 33 is minimized. Under the correctly set condition, in a case of 0 (zero), the optical spot is brought to a focus condition. In a case of being positive and negative, the optical spot is brought to a defocus condition displaced from the focus condition.

These error signals TE, FE(W) and FE(R) are inputted into a servo-signal generating circuit 73. The servo-signal generating circuit 73 generates a track control signal TC and a focus control signal FC serving as servo signals, and applies such signals to a tracking coil 74a and a focusing coil 74b which cooperate with each other to form a lens actuator.

The objective lens 56 is controlled in movement in the track transverse direction by the track control signal TC to perform control such that the optical spot formed on the track 34b of the optical card 32 holds a tracking condition located at the center (in a widthwise direction) of the data track 64i.

Further, the objective lens 56 is controlled in movement to an optical-axis direction by the focus control signal FC, and performs so control as to hold a focus condition under which each of the optical spots formed on the optical card 32 is brought to sufficiently small size.

The reproducing laser diode 58 is controlled in intensity of light emission by an APC circuit 75. Moreover, the recording laser diode 51 is controlled by a light-intensity or light-quantity control circuit 76 such that the intensity of light emission thereof is brought to a low level, during a period of time of a reproducing mode or the like other than a recording mode. Furthermore, at the recording mode, the signal recorded from the side of the controller 43 is inputted to a modulation circuit 77 and is modulated thereby and, subsequently, the modulation signal is applied to the recording laser diode S1 through the light-intensity control circuit 76.

Figure 7:
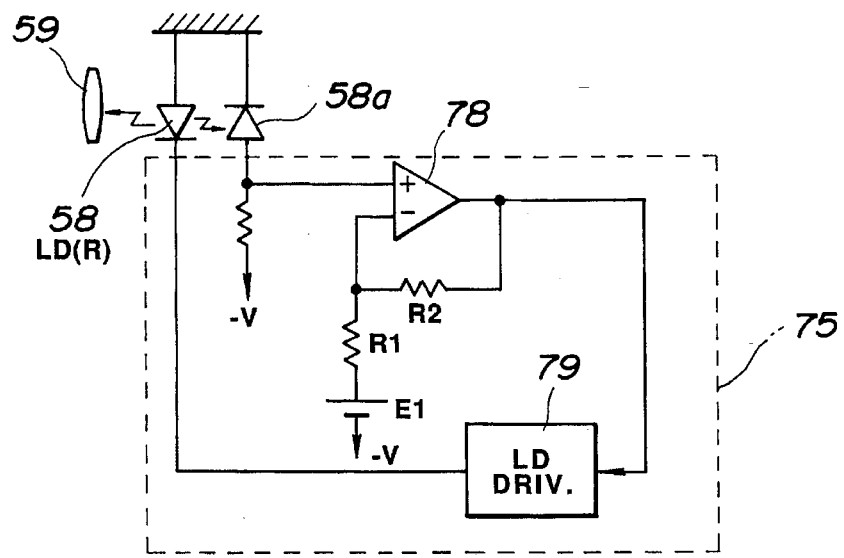
Figure 8:
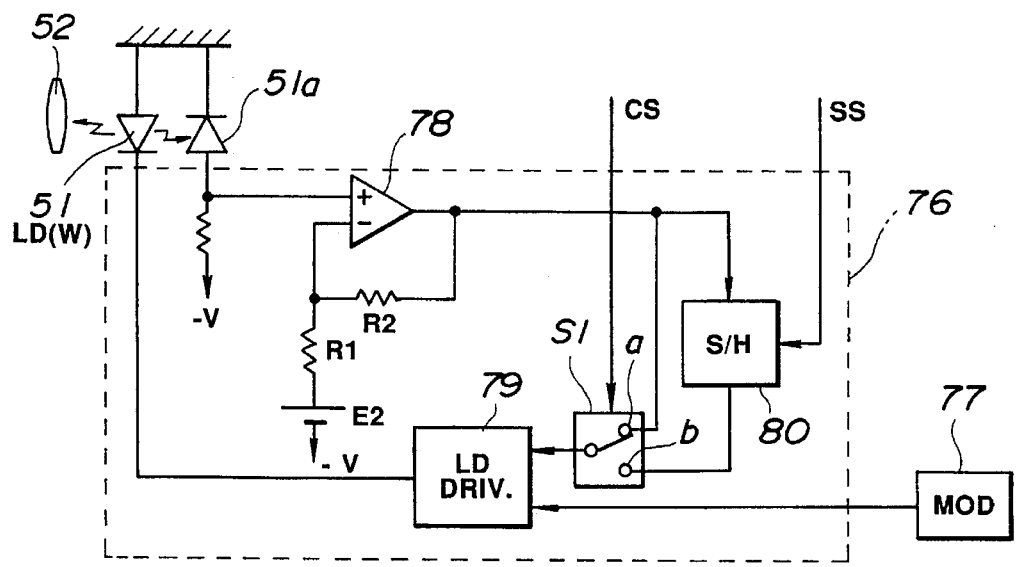

FIGS. 7 and 8 show an arrangement of the APC circuit 75 and an arrangement of the light-intensity control circuit 76. In the APC circuit 75 illustrated in FIG. 7, an output from a pin photo diode 58a for detecting rearward light of the reproducing laser diode 58 is inputted to an error amplifier 78, and is compared with a reference level E1 for setting the intensity of reference light emission. A quantity of shift or offset from the reference level E1 is amplified. Thus, a light-intensity control loop of negative feedback is formed which supplies a drive signal to the reproducing laser diode 58 through an LD driver 79.

With the arrangement, the intensity of light emission of the reproducing laser diode 58 is automatically power controlled (APC) so as to hold the reference intensity of light emission corresponding to the reference level E1.

In the light-intensity control circuit 76 illustrated in FIG. 8, as shown in FIG. 7, a pin photo diode 51a is used which detects the rearward light of the recording laser diode 51 in place of the pin photo diode 58a, and a switch S1 and a sample/hold circuit 80 are interposed between an error amplifier 78 and the LD driver 79.

Further, a modulating signal is applied to the LD driver 80 from a modulation circuit 77. The switch S1 and the sample/hold circuit 80 perform switching and control of the sample/hold by a switching signal CS from the controller 43 and a sample/hold signal SS.

That is, in the reproducing mode, a contact a of the switch S1 is turned ON, and light-intensity control is performed which is similar to APC of the reproducing laser diode 58. The sample/hold circuit 80 holds an output from the error amplifier 78 immediately before the sample/hold circuit 80 is switched by the sample/hold signal SS immediately before being switched to the recording mode. After this holding, a contact b of the switch S1 is turned ON by the switching signal CS.

Accordingly, in the reproducing mode, light-intensity control is performed with respect to the recording laser diode 51 similarly to the APC of the reproducing laser diode 58. In the recording mode, the level value sampled/held is brought to a bottom value at the light emission level in the recording mode. The recording laser diode 51 emits light at a value to which the modulating signal from the modulating circuit 77 is added.

Figure 9:
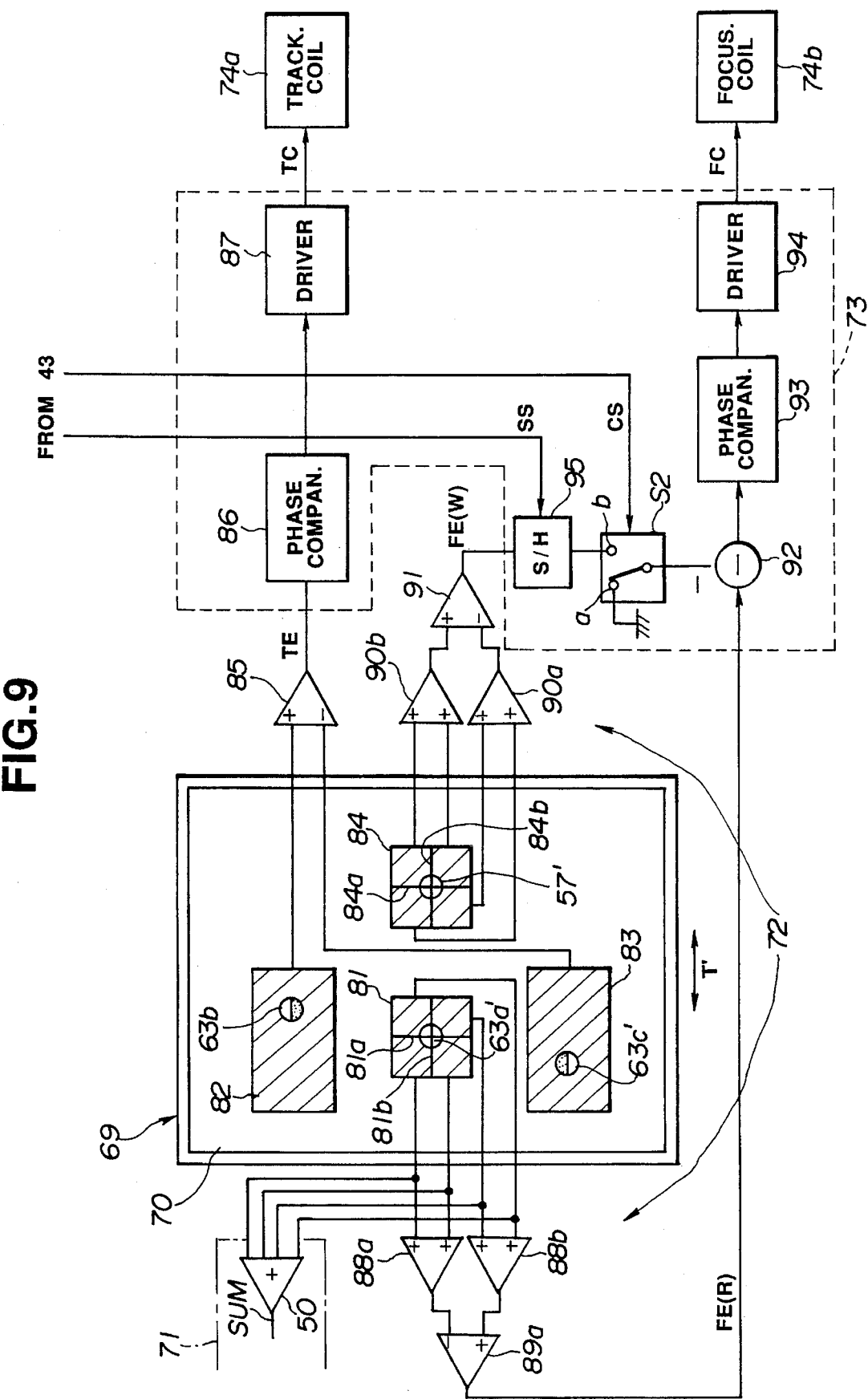

FIG. 9 shows an arrangement of the photo detector 69, the error-signal generating circuit 72 and the like.

A four-divided light receiving element 81 of the 0 (zero)-order light of the reproducing light, a pair of light receiving elements 82 and 83 of the ±primary diffracted lights of the reproducing light, and a four-divided light receiving element 84 of the recording light are provided on a light receiving surface 70 of the photo detector 69. As shown in FIG. 6, under a condition in which focus control and tracking control are correctly performed, an image 63a' of the optical spot due to the 0 (zero)-order light of the reproducing light is positioned on the four-divided light receiving element 81, images 63b' and 63c' of the respective optical spots due to the ± primary diffracted lights are positioned respectively on the light receiving elements 82 and 83, and an image 57' of the recording optical spot is positioned on the four-divided light receiving element 84. In FIG. 9, the reference character T' is set to a direction corresponding to the track direction T.

In the optical system of the present embodiment, the tracking control performs tracking detection by a so-called three (3)-beam system. That is, the optical spots 63b and 63c due respectively to the ± primary diffracted lights of the reproducing light illustrated in FIG. 6 utilize the fact that the intensity of received light of the light receiving elements 82 and 83 of the photo detector 69 illustrated in FIG. 9 is changed by variation in intensity or quantity applied to the guide tracks 65a and 65d, to drive the objective lens 56 in a direction extending perpendicularly to the track direction T such that the intensities of received lights of the light receiving elements 82 and 83 are made equal to each other, to thereby perform the tracking control.

For this reason, outputs from the respective light receiving elements 82 and 83 are inputted to a subtracter 85, and are subtracted thereby so that a tracking error signal TE is generated. The tracking error signal TE is applied to a tracking coil 74a through a phase compensating circuit 86 and a driver 87.

On the other hand, the focus control is such that, as shown in FIG. 5, the reproducing light and the recording light are incident upon a position eccentric from the optical axis of the objective lens 56 so as to enable the focus control to be performed by the reproducing light and the recording light by a so-called shaft-off system.

That is, if focus shift occurs, the image 63a' of the optical spot due to the 0 (zero)-order light of the reproducing light is moved in a direction of a divided line 81b (parallel with the direction T') extending perpendicularly to a divided line 81a on the four-divided light receiving element 81, on the light receiving surface 80 of the photo detector 69. The image 57' of the recording optical spot is moved in a direction of a divided line 84b extending perpendicularly to a divided line 84a, on the four-divided light receiving element 84. Accordingly, by the fact that a difference between outputs from the respective light receiving elements on both sides of each of the divided lines 81a and 84a of the respective four-divided light receiving elements 81 and 84 is taken, there can be produced a focus detecting signal of the reproducing light and a focus detecting signal of the recording light.

For this reason, outputs from the two pairs of light receiving elements on both sides of the divided line 81a of the four-divided light receiving element 81 are added to each other respectively by a pair of adders 88a and 88b. Outputs from the respective adders 88a and 88b are subtracted by a subtracter 89a so that a focus error signal FE (R) with respect to the reproducing light is generated.

Moreover, outputs from the four elements of the four-divided light receiving element 81 are inputted to the modulating circuit 71. Outputs from the respective adders 88a and 88b are added to each other by an adder 50 so that a sum signal SUM is generated which is used in a signal for reproducing information of a pit array which is recorded onto the optical card 32.

Furthermore, outputs from the two pairs of light receiving elements on both sides of the divided line 84a of the four-divided light receiving element 84 are added to each other by a pair of adders 90a and 90b. Outputs from the respective adders 90a and 90b are subtracted by a subtracter 91 so that a focus error signal FE(W) is generated with respect to the recording light.

The focus error signal FE(R) is applied to a focusing coil 74b through a subtracter 92, a phase compensating circuit 93, and a driver 94. Further, the focus error signal FE(W) is applied to the subtracter 92 through a sample/hold circuit 95 and a switch S2.

The switch S2 and the sample/hold circuit 95 perform switching and control of sampling/holding, by the switching signal CS and the sample/hold signal SS from the controller 43.

That is, in the reproducing mode, the switch S1 is such that the contact A is turned ON, to generate the focus control signal FC only by the focus error signal FE(R) which is generated by the output from the four-divided light receiving element 81 for detecting the image 63a' of the optical spot due to the 0 (zero)-order light of the reproducing light. This is natural focus control, because, in the reproducing mode, presence and absence of the pit are detected by the reproducing light to perform reproduction of the recorded information.

In the present embodiment, since, in the recording mode, the recording light is not used to perform the focus control, but the reproducing light is used to perform the focus control, the optical system for condensing and irradiating the reproducing light onto the optical card 32 and the optical system for condensing and irradiating the recording light onto the optical card 32 to detect reflected light are not all common to each other. Accordingly, first, focus regulations of these respective optical systems are performed.

Regulations of these respective optical systems are so arranged as to, for example, detect output waveforms of the respective focus error signals FE(R) and FE(W) which are detected by application of positive and negative step-like drive signals to the focus coil 74b. The optical systems are regulated such that the detected waveforms are symmetric with each other when the drive signal is a value of 0 (zero), and setting is made to a condition where there is no offset.

In this case, it is desired that, in a case where one of them is under the focus condition, the other is under the focus condition. However, since there exists an optical system portion which is not common, there may be caused a case where one is under the focus condition, and the other is not brought to the focus condition (referred to as "relative focus offset").

Further, there may be caused a case where relative positions of respective constitutional elements which form the optical head 33 shift under a secular change, and relative positions of constitutional elements which form the optical head 33 by extension/contraction or the like shift or the like by affection of a temperature change so that, in a case where one of them is under the focus condition, the other is not brought to a focus condition.

For this reason, in the present embodiment, under the focus control condition on the basis of the reproducing light, a value of the focus error signal on the basis of the recording light is detected to retain or hold a relative focus offset value of both the focus control systems. In a case where the focus control on the basis of the reproducing light is performed upon recording operation, the focus condition is displaced only through the held relative focus offset value to perform the focus control so that this is brought to equivalence to a case where there is no relative focus offset. Function thereof will hereunder be described.

By the sample/hold signal SS immediately before being switched to the recording mode, the sample/hold circuit 95 retains or holds the focus error signal FE(W) which is generated by an output form the four-divided light receiving element 84 detecting the image 57a' of the optical spot of the recording light at a low level prior to recording and light emitting. After the holding, the switch S2 is such that the contact b is turned ON by the switching signal CS.

Accordingly, in the recording mode, a relative focus offset value of the focus error signal FE(W) In the intensity of light emission at a low level of the recording laser diode 51 in the reproducing mode is subtracted from the focus error signal FE(R) due to the 0 (zero)-order light of the reproducing light by the subtracter 92, to generate a focus control signal FC.

In the optical information recording and reproducing apparatus 31 according to the present embodiment, the intensity of light emission of the recording laser diode 51 is controlled by the light-intensity control circuit 76 illustrated in FIG. 3. The recording light is irradiated onto the optical card 32 from the objective lens 56 at the light intensity less than that upon recording operation also during a period of time other than the time of recording operation, for example, upon reproducing and upon waiting (recording and reproducing are not performed), so that there can be produced the focus error signal FE(W) by the reflected light from the optical card 32 due to the recording light.

The recording light (at low light emission level) immediately before entering the recording operation is used to subtract a value of the focus error signal FE(W) from the focus error signal FE(R) which is performed by the reproducing light, whereby focus shift upon the time of recording operation is eliminated to accurately record the information.

Operation of the embodiment will next be described with reference to FIGS. 10a to 10o. First, in a case of the reproducing mode, the switch S1 is such that the contact a is turned ON as illustrated in FIG. 10f (because the switching signal CS is "L" as shown in FIG. 10e). Accordingly, the drive current of the LD drive circuit 79 in FIG. 8 is small (refer to FIG. 10c). The intensity of light emission of the recording laser diode 51 is set substantially to the same value as the intensity of light emission of the reproducing laser diode 58 (refer to FIG. 10a and FIG. 10b).

Moreover, since the switching signal CS is "L", the switch S2 is such that the contact a is turned ON as shown in FIG. 10f (S3 is a switch in a third embodiment to be described subsequently). Accordingly, as shown in FIGS. 10a to 10o, the focus control signal FC is generated only by the focus error signal FE(R) which is generated by the output from the four-divided light receiving element 81 for detecting the image 63a' of the optical spot due to the 0 (zero)-order light of the reproducing light, to drive the focus coil 74b to thereby hold the objective lens 56 under the focus condition.

Under a condition where the focus servo is performed, the focus error signal FE(R) holds a condition where the focus error signal is always brought to 0 (zero), as shown In FIG. 10g. Furthermore, the output from the subtracter 92 illustrated in FIG. 10l is also brought to zero (0).

Further, tracking control is performed on the basis of the track error signal TE which is generated by the differential output from the light receiving elements 82 and 83 which light-receive the images 63b' and 63c' of the optical spot due to the ± primary diffracted lights of the reproducing light.

By the way, as shown in FIG. 5, the optical system (the collimate lens 52 and the prism 53, for example) for guiding the light of the recording laser diode 51 and the optical system for guiding the light of the reproducing laser diode 51 are separate from each other. Accordingly, there may occur that the focus condition due to the reproducing light and the focus condition due to the recording light shift from each other by a secular change or the like. In this case, as shown in FIG. 10g, in a case where the focus error signal FE(R) is 0 (zero), the focus error signal FE(W) generated by detection of the recording light at a low level is brought to a value different from 0 (zero), as shown in FIG. 10h. Thus, there may occur relative focus offset.

Accordingly, in a case of being switched to the recording mode, if the focus control is performed by the focus error signal FE(R) the same as that of the reproducing mode, the focus control shifts only by the offset value from the focus condition. The present embodiment performs as follows to dissolve the relative offset.

The sample/hold circuit 95 illustrated in FIG. 9 detects the recording light at the low level by the signal SS illustrated in FIG. 10d immediately before being switched to the recording mode, to hold a value of the generated focus error signal FE(W), that is, a relative focus offset value Vf.

Since the held offset value Vf is such that the switching signal CS is brought to "H", the offset value Vf is applied to the subtracter 92 through the contact b of the switch S2. This offset value Vf is subtracted from the value of the focus error signal FE (R). The subtracted signal, that is, an output FE(R)−Vf from the subtracter 92 is employed as a focus error signal FE at the recording mode. Focus control is performed such that the focus error signal FE is brought to 0 (zero).

In this case, the focus error signal FE(R) maintains the offset value Vf. Even if the light emission at the low level is maintained also at the recording mode, the focus error signal FE(W) maintains 0 (zero) (indicated by a dot-and-chain line in FIG. 10h). In the recording mode, actually, the modulating signal is applied from the modulating circuit 77 to the LD drive circuit 79. An output from the LD drive circuit 79 is brought to the low level and a high level as shown in FIG. 10c. A light emitting output from the recording laser diode 51 is brought to one illustrated in FIG. 10a.

If the recording laser diode 51 emits light at the high level, energy density of a portion in which the recording optical spot 57 is formed is raised. Thus, a thermally irreversible change occurs In the data tracks on the optical card 32 so that a pit 66 is formed.

The operation of the reproducing mode and the operation of the recording mode have been described above. Even, for example, also in the waiting mode, however, the light emission level of the recording laser diode 51 is held to the low level, similarly to the reproducing mode (refer to FIGS. 10a to 10o). FIGS. 10j to 10o illustrate an arrangement for description of the third embodiment to be described subsequently.

In this first embodiment, the intensity of light emission of the recording laser diode 51 is controlled to the low level by the light-intensity control circuit 76 at the time of reproduction and at the time of waiting other than the time of recording operation. When the recording laser diode 51 emits light at the low level, the light intensity of the recording light which is irradiated upon the optical card 32 through the objective lens 56 is of the order that the thermally irreversible variation does not occur on the recording surface of the optical card 32. Accordingly, even if the recording light is irradiated upon the optical card 32 other than the time of recording operation, the optical card 32 is not depleted or deteriorated.

According to the first embodiment of the invention, the arrangement is such that the recording laser diode 51 emits light at the low level at the time other than the time of the recording operation, to produce the focus error signal. Accordingly, the objective lens 56 is focus-controlled by the signal that a difference between the focus error signal immediately before the recording operation is performed and the focus error signal which is produced by the use of the reproducing light is subtracted from the focus error signal which is produced by the use of the reproducing light, to dissolve the relative offset, whereby the recording optical spot formed by irradiation to the optical card 32 in the period of recording operation time can be maintained to the focus condition.

In connection with the above, a signal which dissolves the relative offset light-emits the recording laser diode 51 (under the turning-off condition) at the low level immediately before the recording operation, so as to be capable of recording also by detection of a difference between both the focus error signals due to the recording light and the reproducing light. However, immediately before performing the recording, a difference must be found to generate a signal dissolving the offset after operation in which operation is performed in which the recording laser diode 51 emits light at the low level. For this reason, it takes time from the time in which a recording command is received to the time in which the recording operation is actually performed. Moreover, a burden of the controller 43 which performs such controls increases.

Over against this, in the present embodiment, since the recording diode 51 always emits light at the low level at the time other than the recording operation, it is possible to detect the difference at once immediately before the recording is performed, to generate a signal in which the offset is dissolved. Accordingly, it is possible to shorten or reduce time from the time in which a command of the recording is received to the time in which recording operation is actually performed. Furthermore, a burden of the controller 43 which performs these controls can be reduced or lightened.

Further, since the recording laser diode 51 always emits light at the low level at the time other than recording operation, it is possible to reduce variation or change in transient light-emitting characteristic of the recording laser diode 51 in the vicinity of the period of time at which the recording operation starts (as compared with a case where the recording laser diode 51 emits light immediately before the recording operation). Thus, it is possible to form a more uniform pit.

In connection with the above, the light intensity of the recording light at the time other than the recording operation is relatively smaller than the total light intensity of the reproducing light which is irradiated to the optical card 32 through the objective lens 56. Since the total light intensity of the reproducing light is relatively larger than the light intensity of the recording light, even if the reproducing light is divided at any light-intensity rate into three optical spots including the optical spot 63a due to the 0 (zero)-order light and the optical spots 63b and 63c due respectively to the ± primary diffracted lights, the light quantities of the respective optical spots are sufficient for reproduction of the information, the focus control and the tracking control. Thus, it is possible to accurately reproduce the information.

In the present embodiment, the light intensity of the recording light at the time other than the recording operation is so arranged as to be equal to the light intensity of 0 (zero)-order light of the reproducing light.

By doing so, in a case where the focus error signal which dissolves the relative offset required at recording is generated, a difference of the output detected by the light receiving elements 81 and 84 serves as an offset value, and the offset value should be added (or subtracted) to the focus error signal produced by the use of the reproducing light without a difference of the light intensity between the reproducing light and the recording light being taken into consideration (over against this, if the light intensity of the recording light and the light intensity of the 0 (zero)-order light of the reproducing light at the time other than the recording operation are not equal to each other, a correcting coefficient must be added or subtracted such that these light intensity ratios are made equal to each other). In this connection, it is assumed that the light receiving elements 81 and 84 are set to the same characteristic.

As described above, since the light intensity of the recording light at the time other than the recording operation is so arranged as to be relatively smaller than the total light intensity of the reproducing light irradiated upon the optical card 32 through the objective lens 56, there is no case where the light intensity of the recording light exerts a bad influence upon the optical card 32.

In connection with the above, at the time of the recording operation, it is possible also to perform the focus control by the use of the recording light in place of the fact that the reproducing light is used to perform the focus control. However, upon the recording operation, the intensity of light emission largely varies by the recorded information or the modulating signal, whereas the reproducing light can always be maintained constant. Accordingly, there is a merit that switching of a gain of servo loop or the like is not required. Thus, it is possible to simplify the control.

A second embodiment of the invention will next be described. The embodiment is so characterized as to be arranged such that information recorded onto a plurality of tracks is concurrently read out.

Figure 11:
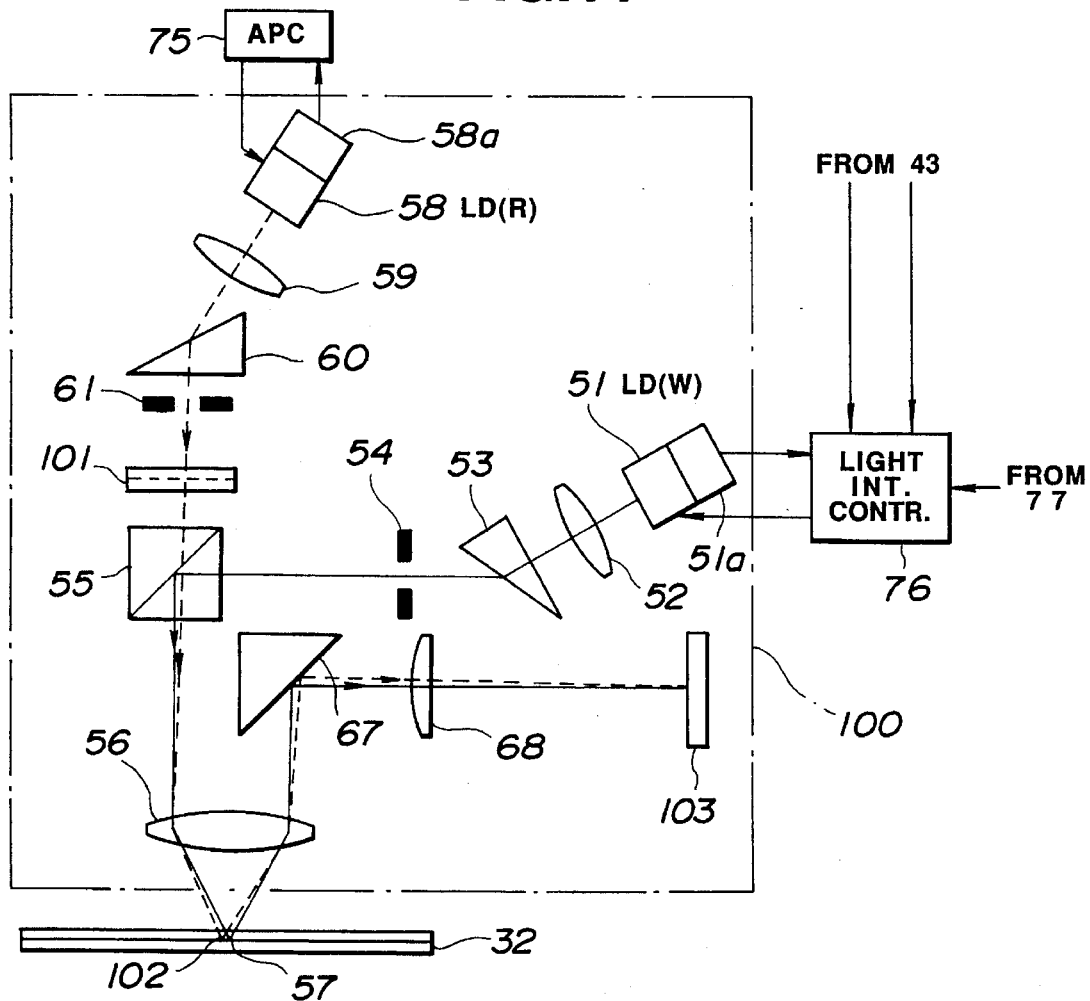
FIG. 11 to FIG. 13 relate to a second embodiment of the invention, FIG. 11 being an arrangement view showing an optical system of an optical information recording and reproducing apparatus according to the second embodiment of the invention.

FIG. 11 shows an optical system of an optical head 100 in the second embodiment of the invention.

The optical system illustrated in FIG. 11 is arranged such that, in FIG. 5, a cylindrical lens 101 is arranged on an optical path in place of the diffracted grating 62 for separating the reproducing light into the 0 (zero)-order light and the ± primary diffracted lights and that the reproducing light is irradiated upon an optical recording medium as a slit-like optical spot, to concurrently read out the information recorded onto the plurality of tracks.

Process through which a recording optical spot 57 is formed by the light generated from a recording laser diode 51 is totally the same as that of the first embodiment.

On the other hand, the reproducing light utilizes, as a light source, a reproducing laser diode 58 which is provided separately from the recording laser diode 51, and is brought to substantially elliptic parallel light by a collimate lens 59. The parallel light is enlarged only in a minor-axis direction of the ellipse by a shaping prism 60 and is shaped substantially into a circular form and, subsequently, a diameter of the parallel light is restricted such that size of the reproducing optical spot is brought to a predetermined value by a stop or iris 61.

Subsequently, the reproducing light is incident upon the cylindrical lens 101, and is brought to light which slightly diverges in a direction extending perpendicularly to a track extending direction of an optical card 32. Since the reproducing light is incident upon a reflecting surface of a polarization beam splitter 55 substantially at P-polarization, almost all of the reproducing light is transmitted and is incident upon a position eccentric from an optical axis of an objective lens 56. The reproducing light is condensed onto the optical card 32, and is brought to a slit-like optical spot 102 which is long in a direction extending perpendicularly to a track extending direction.

Figure 12:
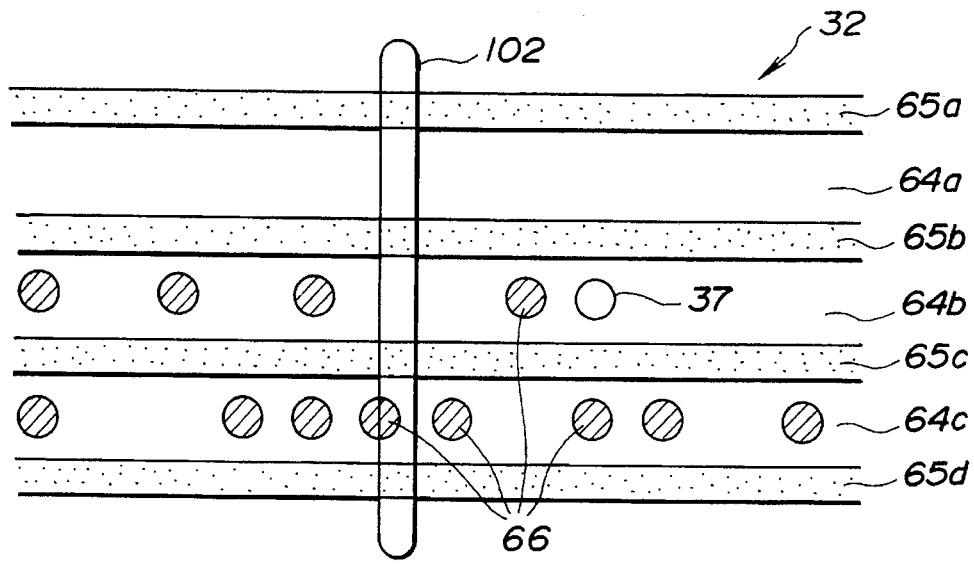

FIG. 12 is a view in which a portion of the optical card 32 is enlarged, to describe an aspect of the data tracks and the optical spot. A plurality of guide tracks 65a, 65b, 65c and 65d different in reflection factor from the data tracks are formed between data tracks 64a, 64b and 64c on the optical card 32.

In the optical system for the optical head 100, illustrated in FIG. 11, a minute relative angle difference is given to the optical axis of the recording light and the optical axis of the reproducing light incident upon the objective lens 56. Accordingly, when the recording optical spot 57 is formed, for example, into the data track 64b, the slit-like optical spot 102 of the reproducing light is formed on a position slightly remote from the recording optical spot 57 in the track extending direction so as to span the plurality of data tracks including the same data track 64b.

On the other hand, the recording light and the reproducing light reflected on the optical card 32 pass again through the objective lens 56 in the opposite direction, and are reflected by a mirror 67 and, subsequently, are condensed by an imaging lens 68 to form an image of the recording optical spot 57 and an image of the slit-like optical spot 102 due to the reproducing light on the light receiving surface of the photo detector 103.

Figure 13:
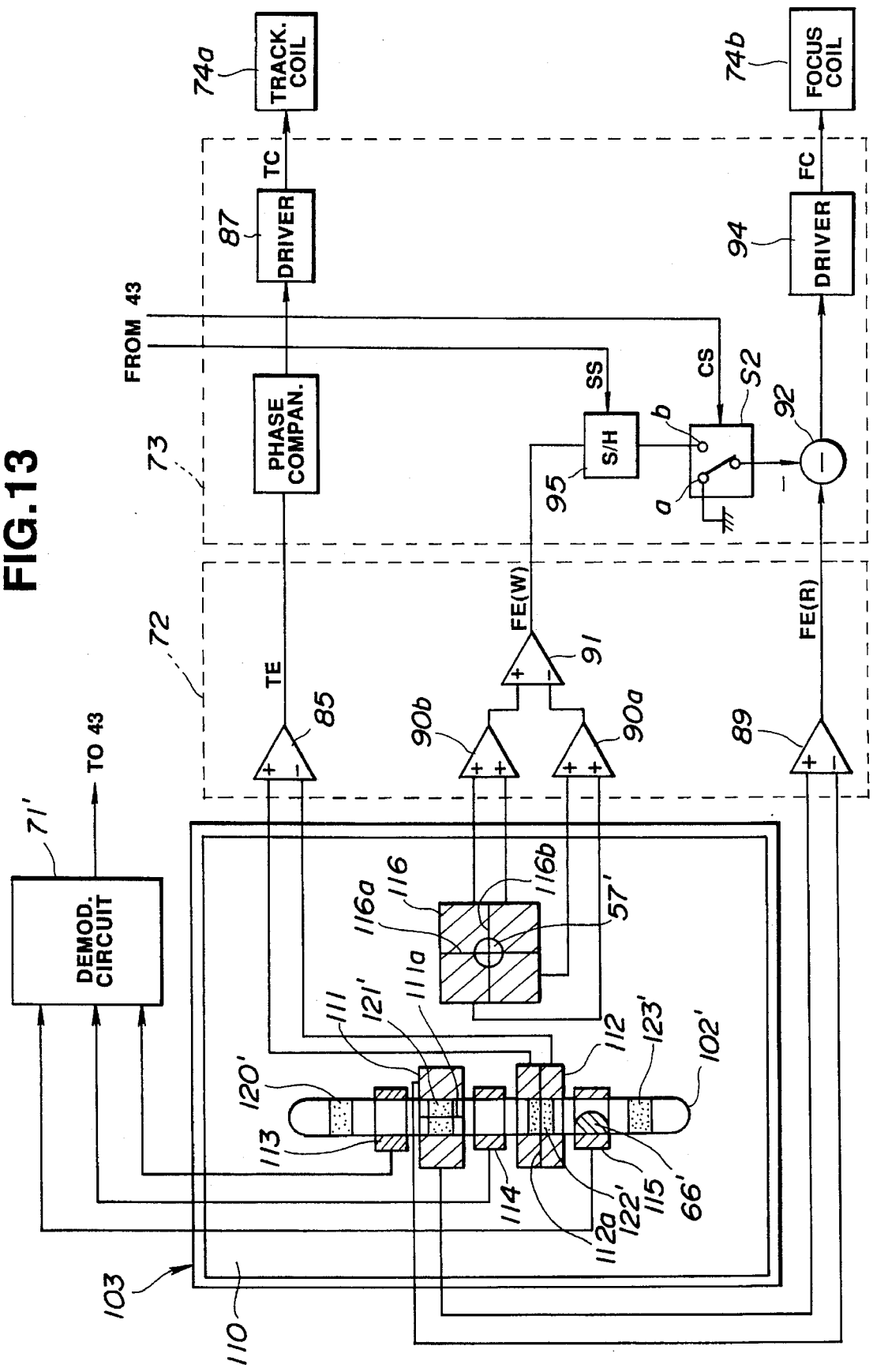

FIG. 13 shows, in detail, a photo detector 103, an error-signal generating circuit 72 and the like illustrated in FIG. 11. Light receiving elements 113, 114 and 115 for receiving reproducing light to generate a reproducing signal of a plurality of tracks, a two-divided light receiving element 111 for performing focus detection, a two-divided light receiving element 112 for performing tracking detection, and four-divided light receiving element 116 for receiving recording light are provided on a light receiving surface 110 of the photo detector 103.

As shown in FIG. 13, under a condition that the focus control and the tracking control are correctly performed, an image 102' of the slit-like optical spot due to the reproducing light, images 120', 121', 122' and 123' of the guide tracks formed within the image 102', and an image 66' of the pit are positioned on the light receiving elements 111, 112, 113, 114 and 115 which are arranged in line. An image 57' of the recording optical spot is positioned on the four-divided light receiving element 116.

Outputs form the respective light receiving elements 113, 114 and 115 are inputted into a demodulating circuit 71' and concurrently reproduces information recorded onto a plurality of tracks (three tracks in this case).

Moreover, in the optical system according to the present embodiment, outputs from the respective light receiving elements on both sides of a dividing line 112a of a two-divided light receiving element 112 are inputted to a subtracter 85 such that the image 122' of each of the guide tracks illustrated in FIG. 13 is formed equally on both sides of the dividing line 112a of the two-divided light receiving element 112 for detection of tracking, to generate a difference signal, to thereby produce a tracking error signal TE.

On the other hand, focus control is totally the same as that of the first embodiment. Focus detection can be performed by the reproducing light and the recording light by a so-called shaft-offset system.

Particularly, the reproducing light is arranged as follows. That is, when the focus shift occurs, the entire image 102' of the slit-like optical spot is moved on the light receiving surface 110 of the photo detector 103 in a direction extending on the two-divided light receiving element 111 perpendicularly to the dividing line 111a. Accordingly, the outputs from the respective light receiving elements on both sides of the dividing line 111a of the two-divided light receiving element 111 are inputted to a subtracter 89, to thereby generate a difference signal. Thus, there is produced a focus error signal FE(R) for the reproducing light.

Moreover, the intensity of light emission of the recording laser diode 51 is controlled by the light-intensity control circuit 76 illustrated in FIG. 11. Also at the time other than the time of the recording operation, the recording light is irradiated upon the optical card 32 from the objective lens 56 at the light intensity less than that upon the time of recording operation, to produce a focus error signal FE(W) by the use of the recording light at a low level.

That is, the outputs from the two respective light receiving elements on both sides of a dividing line 116a of the four-divided light receiving element 116 are added to each other by a pair of adders 90a and 90b. Outputs form the respective adders 90a and 90b are subtracted from each other by the subtracter 91 so that the focus error signal FE(W) is generated with respect to the recording light.

An offset value is subtracted from the focus error signal FE(R) performed by the reproducing light in accordance with the focus error signal FE(W) due to the recording light at the low level immediately before entering the recording operation, whereby relative focus offset or shift at the time of recording operation is eliminated or dispensed with to accurately record the information.

As described above, at the time other than the time of the recording operation, the intensity of light emission of the recording laser diode 51 is controlled to a low level by the light-intensity control circuit 76. When the recording laser diode 51 emits light at the low level, the light intensity of the recording light irradiated to the optical card 32 through the objective lens 56 is of the order of not generating the thermally irreversible change or variation on the optical card and, simultaneously, is relatively smaller than the total light intensity of the reproducing light which is irradiated upon the optical card 32 through the objective lens 56.

Accordingly, even if the recording light is irradiated upon the optical card 32 at the time other than the recording operation time, the optical card 32 is not deteriorated. Further, the light intensity of the recording light is relatively smaller than the total light intensity of the reproducing light. In other words, the total light intensity of the reproducing light is relatively larger than the light intensity of the recording light. Accordingly, even if the reproducing light illuminates an area greater than the recording light, the light intensity irradiated per a unit area is not remarkably small with respect to the recording light. The light intensity is sufficient for reproduction of the information, the focus control and the tracking control. Thus, it is possible to accurately and concurrently reproduce these information from the plurality of tracks.

Other arrangements of the optical information recording and reproducing apparauts according to the present embodiment are the same as those illustrated in FIG. 3, and the description thereof will be omitted.

Moreover, in the present embodiment, functions other than the fact that the information recorded onto the plurality of tracks can simultaneously be reproduced are similar to those in a case of the apparatus according the first embodiment of the invention.

Figure 14:
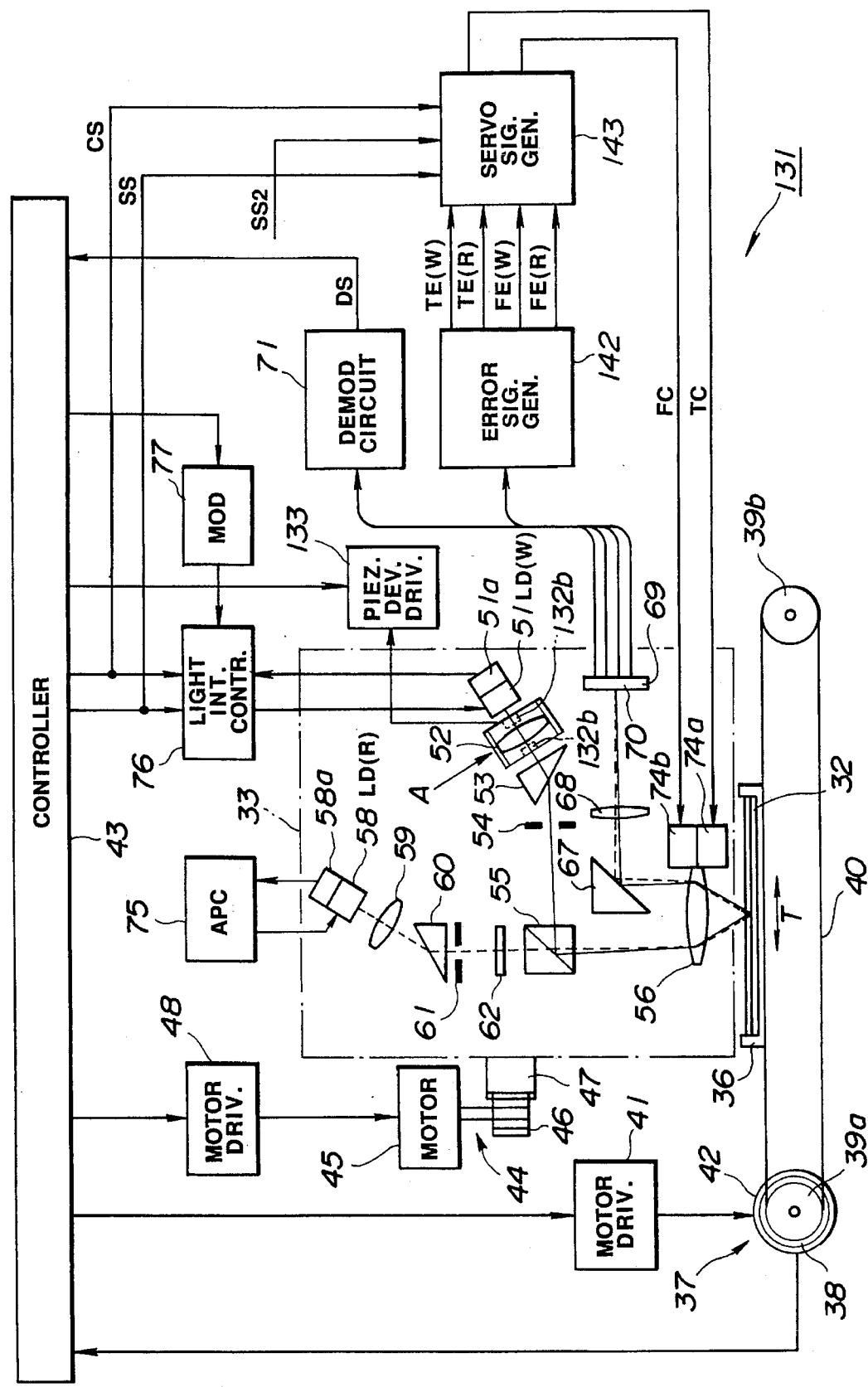

FIG. 14 shows an optical information recording and reproducing apparatus 131 according to a third embodiment of the invention. In the first embodiment, the recording light at the low level is used to dissolve the relative focus offset in the focus control at the recording mode. Over against this, in the present embodiment, recording light at a low level is used to dissolve both offsets in focus control and tracking control at a recording mode.

The apparatus 131 is provided with a vibration mechanism of the recording light, for vibrating the recording light at the low level in a direction extending perpendicularly to a track direction, in the apparatus 31 illustrated in FIG. 3 according to the first embodiment of the invention. For example, the apparatus 131 is provided with a piezoelectric element 132 for minutely vibrating a collimate lens 52, and a piezoelectric-device drive circuit 133 for applying a drive signal to the piezoelectric element 132. Operation of the piezoelectric-device drive circuit 133 is controlled by a controller 43.

Figure 15A:
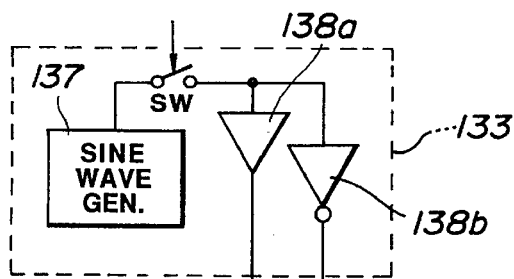
FIG. 15a is a cross-sectional view showing a collimate lens and the like as viewed from a direction $\underline{A}$ in FIG. 14.
Figure 15C:
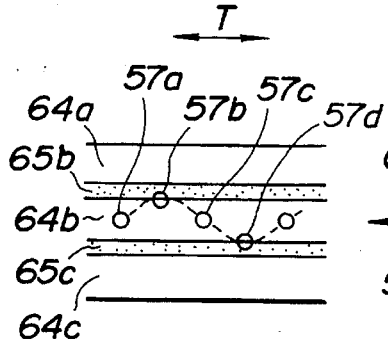
FIG. 15c is a view for explanation, showing a locus of an optical spot under a tracking condition.
Figure 15D:
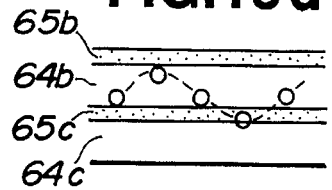
FIG. 15d is a view for explanation, showing the locus of the optical spot under the tracking condition having relative offset.
Figure 15B:
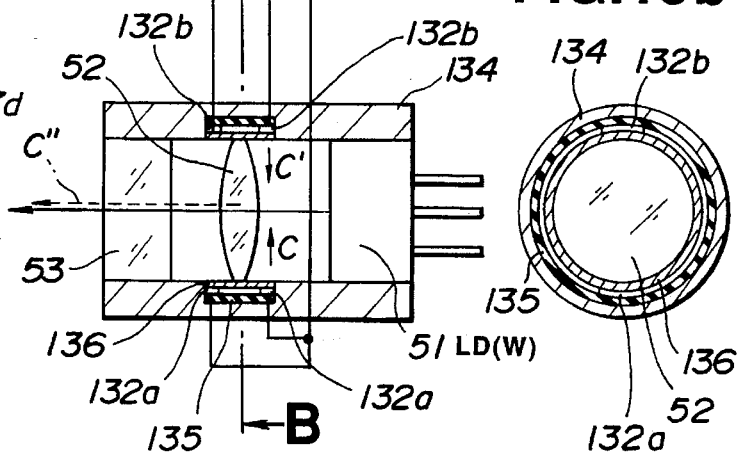

FIGS. 15a and 15b show the vibration mechanism of the recording light. A recording laser diode 51 (stored type of a pin photo diode), and a shaping prism 53 are mounted on a lens tube 134, and a collimate lens 52 is mounted on the lens tube 134 through an elastic tube 135 and piezoelectric elements 132a and 132b and a ring 136.

A sinewave signal from a sinewave generating circuit 137, for example, which forms a piezoelectric-device drive circuit 133, passes through a switch SW, a buffer 138a and an inverted buffer 138b, and drive signals opposite in polarity from each other are applied to the piezoelectric elements 132a and 132b. The switch SW is controlled in opening and closing by the controller 43.

If the drive signal which is applied to the piezoelectric element 132a is, for example, a positive value, a negative drive signal is applied to the other piezoelectric element 132b. In this case, when the piezoelectric element 132a is expanded by piezoelectric characteristic, the other piezoelectric element 132b is compressed. The compressed piezoelectric element 132b moves the ring 136 in a direction indicated by reference character $\underline{C}$ to move the collimate lens 52 in the direction vertical to the optical-axis.

In this case, a center of the light passing through the collimate lens 52 proceeds in a direction indicated by a broken line C" from an optical-axis direction indicated by a solid line. The optical card 32 is moved from a position of an optical spot 57a in a case where the collimate lens 52 is not moved to a position shifting in a direction perpendicular to a track direction $\underline{T}$, like a position of an optical spot 57b illustrated in FIG. 15c.

On the other hand, if the negative drive signal is applied to the piezoelectric element 132a and the positive drive signal is applied to the piezoelectric element 132b, the collimate lens 52 is moved parallel in the opposite direction indicated by reference character C'. The optical card 32 is in a position of an optical spot 57d in FIG. 15c.

FIG. 15c shows a locus of the optical spot in a case where the drive signal is applied, under a condition (in a case where the offset of the detecting system of the recording light becomes 0 (zero) by the tracking control due to the reproducing light) that the relative offset of both the optical systems (on the side of the reproducing light and on the side of the recording light) according to the third embodiment of the invention is dissolved. The locus of the optical spot is brought to 57a, 57b, 57c . . . in correspondence with the waveform of the drive signal.

The detecting optical system of the recording light in a case where the sinewave is beforehand applied to a tracking coil 74a prior to the fact that recording or reproducing is performed by this apparatus 131 is so adjusted or regulated such that a signal corresponding to the waveform is detected, and is so regulated as to be a condition that there is no offset of the optical system per se.

On the other hand, in a case where there is a relative offset in a detecting system of a tracking servo of the reproducing light and the recording light, when the drive signal is applied under the tracking control condition due to the reproducing light, shift occurs in a vertical direction (strictly, in a direction perpendicular to the track direction) with a position shifting from a central position on each of the tracks each serving as a center as shown in FIG. 15d.

In connection with the above, the drive signal for vibrating the optical spot of the recording light in a direction perpendicular to the track direction should not be limited to the sinewave, but may be a triangular wave or the like.

Figure 16:
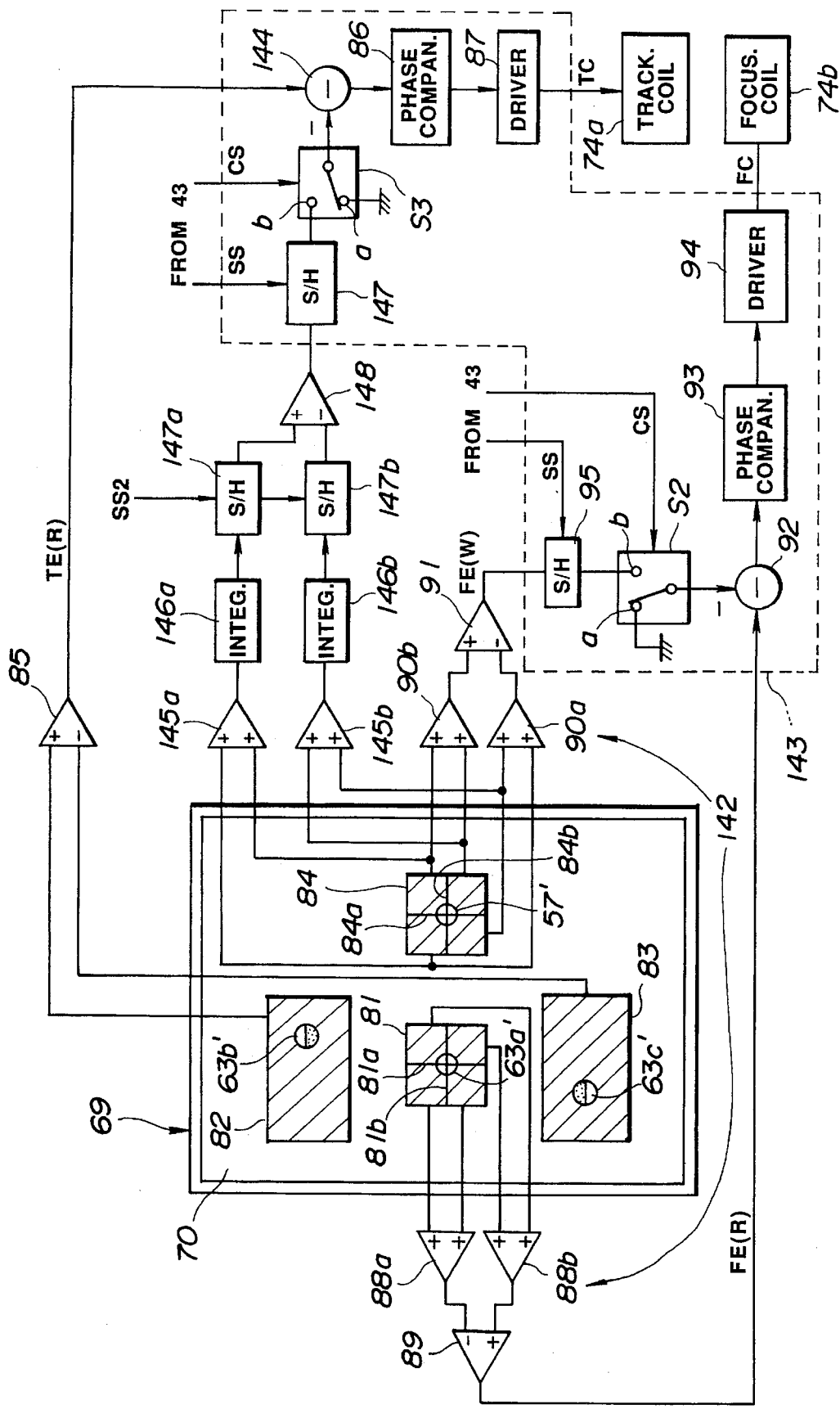

FIG. 16 shows the detail of a photo detector 69, the error-signal generating circuit 142 and the like illustrated in FIG. 14. The photo detector 69 is the same as that shown in FIG. 9. However, a circuit for dissolving the relative tracking offset in the tracking control to be described subsequently is added further to the arrangement illustrated in FIG. 9, which includes the error-signal generating circuit 142 and the servo-signal generating circuit 143.

A tracking error signal TE(R) which uses reproducing light generated by subtraction of the outputs from the respective light receiving elements 82 and 83 by a subtracter 85 is inputted to a subtracter 144. An output from the subtracter 144 is brought to a tracking control signal TC through a phase compensating circuit 86 and a driver 87, similarly to a case of FIG. 9, and is applied to a tracking coil 74a.

Outputs from the respective light receiving elements on both sides of a divided line 84b of the four-divided light receiving element 84 which receives an image 57' of the recording optical spot are added to each other by a pair of adders 145a and 145b. Subsequently, the outputs from the respective light receiving elements are integrated by a pair of integrating circuits 146a and 146b. The integrated signals are inputted respectively to a pair of sample/hold circuits 147a and 147b. After the integrated signals have been sampled/held, the integrated signals are inputted to a subtracter 148, and are subtracted thereby so that a tracking error signal TE(W) is generated.

The integrating circuits 146a and 146b perform integration by time constant of the order of one cycle of the sinewave signal of the sinewave generating circuit 137. After one cycle of the sinewave signal, the sample/hold circuits 147a and 147b hold an integrated signal by an outputted sample/hold signal SS2. After the sample/hold signal, the integrating circuits 146a and 146b may be reset.

The tracking error signal TE(W) is inputted into a subtracter 144 through a sample/hold circuit 149 and a changeover switch S3.

The present embodiment is similar to the first embodiment in that the recording laser diode 51 is controlled to the intensity of light emission at the low level during a period of time other than the time of recording.

The reproducing light is used to perform the focus control and the tracking control during a period of time controlled to the intensity of light emission at the low level, for example, during a period of time of the reproducing mode. Under these control conditions, the recording light of the intensity of light emission at the low level is used to detect a value of the focus error signal and a value of the tracking error signal, that is, a relative value of the focus offset and a value of the tracking offset, to retain or hold these values. During a period of time of the recording mode, the held offset value is subtracted from the focus error signal and the tracking error signal, which use the reproducing light, to perform focus control and tracking control having no relative offset.

Operation of the present embodiment will next be described. The focus control is the same as that in the first embodiment. Operations of the respective various parts regarding this control are brought to ones illustrated in FIGS. 10a to 10i.

In the present embodiment, control is further performed which dissolves the relative tracking offset. For this reason, in the period of time of the reproducing mode, the controller 43 is such that the switch SW is turned ON as shown in FIG.10j, and the sinewave of the sinewave generating circuit 137 (refer to FIG. 10k) is brought to a drive signal through the switch SW, the buffer 138a and the inverted buffer 138b, and is applied to the piezoelectric elements 132a and 132b.

By the application of the drive signal, the collimator lens 52 is such that an optical axis thereof is swung. Accordingly, the optical spot formed on the optical card 32 is swung in a direction crossing the tracks. The locus of the optical spot is brought in time to one illustrated in FIG. 15c or FIG. 15d.

As shown in FIG. 15c, in a case where the optical spot is swung in sinewave having amplitude in a direction (a vertical direction in FIG. 15c or FIG. 15d) crossing the tracks with a central position O in a widthwise direction of each of the tracks each serving as a center, the image 57' is swung in a vertical direction with a divided line 84b of a four-divided light receiving element 84 illustrated in FIG. 16 serving as a center. In this case, the outputs from the respective light receiving elements on both sides of the divided line 84b in a period of time corresponding to a single cycle of the sinewave are made equal to each other.

As shown in FIG. 10l (note that l is el), the two integrated outputs sampled/held by a sample/hold signal SS2 which is outputted every one cycle of the sinewave are made equal to each other. Accordingly, in this case, the output from the subtracter 148, that is, the tracking error signal TE(W) is brought to 0 (zero).

Differentiated from FIG. 15c, under a condition displaced from the position where tracking control is correctly performed as shown in FIG. 15d, if the optical spot is vibrated in a direction perpendicular to a track direction, the two integrating outputs sampled/held by a difference between the reflecting light intensity at the track portion and the reflecting light intensity at the guide portion are made equal to each other. In this case, the output from the subtracter 148, that is, the tracking error signal TE(W) is not brought to 0 (zero), but is brought to a value Vt in accordance with a quantity of displacement from the position where tracking control is correctly performed (refer to FIG. 10m, for example).

In either case illustrated in FIG. 15c or FIG. 15d, the tracking error signal TE(R) using the reproducing light is brought, of course, to 0 (zero) (refer to FIG. 10n).

The tracking error signal is sampled/held by the sample/hold signal SS (refer to FIG. 10d) immediately before being switched to the recording mode, and is held to the sample/hold circuit 149. Subsequently, the switch S3 is changed-over together with the switches S1 and S2 (refer to FIG. 10f). Furthermore, the switch SW is turned OFF at the recording mode.

A value of the tracking error signal TE(W) held at the sample/hold circuit 149 is subtracted from the tracking error signal TE(R) which uses the reproducing light, by the subtracter 144. An output signal of the subtracter 144 is illustrated in FIG. 10o.

The output signal is further brought to a tracking control signal TC further through the phase compensating circuit 86 and the driver 87 and is applied to the tracking coil 74a. The position of the optical spot is controlled such that the signal TC is brought to zero. That is, the signal TC is tracking-controlled.

According to the present embodiment, at recording, it is possible to be maintained to a condition in which there are almost no relative focus offset and no tracking offset. Accordingly, in a case where information is recorded by the apparatus 131, the optical spot is maintained to the focus condition under which the optical spot is sufficiently small, and the position where the optical spot is formed is maintained to a central position of the width of each of the data tracks.

For this reason, it is possible to surely form a pit at a central position of the width of each of the data tracks at the time of recording light emission at a high level. Size of the optical spot increases because of the defocus, for example. Thus, it is possible to prevent a circumstance, from occurring, such as the fact that energy density thereof decreases less than a value required for formation of a pit, and that it is possible to form only an insufficient pit (for example, a thermal trace portion which is not so much changed with respect to a value of a reflection factor of a portion in which no pit is formed).

Further, since the pit is formed at the central position of the width of each of the data tracks, if the tracking control is performed in a case of being reproduced, it is possible to surely detect the recorded pit. If the pit is not formed at the central position of the width of each of the data tracks, even if the tracking control is performed, it may occur that it is impossible to perform scanning such that the optical spot at reproducing covers only a portion of the pit. In this case, a difference in detected signal level decreases between a portion in which the pit is formed and a portion in which the pit is not formed. Possibility which detects error increases also by slight noises. That is, S/N decreases.

Over against this, in the present embodiment, since the pit can be formed at the central position of the width of each of the data tracks, such drawback can be dissolved or solved.

In connection with the above, the present invention should not be limited to the above-described embodiments, but various modifications are possible to make the present invention. For example, in the second embodiment, the cylindrical lens has been used as means for forming the slit-like optical spot. However, lenses in which curvatures or refractive-index distributions in cross-sectional surfaces which include the optical axis and which extend perpendicularly to each other are changed to cause the lenses to have lens functions different from each other, mirrors in which curvatures in cross-sectional surfaces which include the optical axis and which extend perpendicularly to each other are changed to cause the lenses to have reflecting functions different from each other, or the like may be used.

Moreover, the system of focus detection has been described as being the shaft offset method. However, the system of focus detection may be an another method such as an astigmatism method, a critical-angle method, a knife-edge method or the like, and may be an arrangement in which a photo detector for focus detection is additionally or separately provided. Furthermore, an arrangement may be such that photo detectors for focus detection of recording light and reproducing light are separately provided.

Further, the present embodiments have been described such that the recording light other than the time of recording operation is used to perform focus detection or the like. However, a signal for reproducing the information may be taken out or may be fetched from the recording light.

In connection with the above, for example, in the first embodiment and the like, the arrangement has been such that both the recording light and the reproducing light are condensed and irradiated onto the optical card 32 through the common objective lens 56. However, the present invention should not be limited to such specific embodiments. Objective lenses having the same characteristic may be used to perform focus control and tracking control by the reproducing light.

Further. In the above description, the focus control or the tracking control at the time of recording operation has been arranged such that the difference between the reproducing light immediately before the recording operation is performed and the error signal due to the recording light is found. However, the present invention should not be limited to time immediately before the recording operation is performed, but may find the difference at other time in operation other than the recording operation.

For example, under the focus control condition, the focus error signal used in the focus control thereof (for convenience, referred to as "F1". In the above-described embodiments, the focus error signal which uses the reproducing light) is brought substantially to a zero level, during a substantial period of time.

On the other hand, in a case where shift is resulted from a secular change or the like in the focus error signal F1 and the focus error signal which is not used in the focus control (for convenience, referred to as "F2". In the above-described embodiments, the focus error signal which uses the recording light), the focus error signal F2 is not brought to zero, but takes a certain value $f$, for example, correspondingly to the shift (relative shift of F2 in a case where F1 is zero). The value $f$ does not so much vary (of course, except for a case where a change of surrounding environment such as a temperature change or the like is large or the use for a long period of time) during the normal use at the time immediately before the time other than the recording operation (in the time other than the recording operation) and the other time.

For this reason, the invention should not be limited to an arrangement in which, in a case where there exist the time of the recording operation and the time other than the same, a difference is always found immediately before being switched to the time of recording operation to dissolve the offset. For example, an arrangement may be such that only regulation is performed for dissolving the offset once to several times during the use.

In connection with the above, each of the above-described embodiments has been arranged such that the reproducing light is used to perform the focus control (and the tracking control) at the time of recording operation. However, the arrangement may be such that the recording light is used to perform the focus control (and the tracking control) upon the recording operation and upon the reproducing operation.

That is, since the recording light is always turned on upon the recording operation and upon the reproducing operation, it is possible to perform the focus control (and the tracking control) by the recording light upon the recording operation and upon The reproducing operation.

In this case, the focus control due to the recording light uses the output from the light receiving element 16, for example, in the second embodiment. Upon the reproducing operation, a difference with respect to the focus error signal, which uses of the reproducing light immediately before passing to the reproducing operation is found, and the difference is added or subtracted with respect to the focus error signal due to the recording light so as to dissolve the relative offset, whereby it is possible to be maintained to the focus condition in which there is no focus shift, also at the reproducing operation. In this manner, if the focus control is performed by the recording light at the recording operation and at the reproducing operation, there can be provided merits in the following cases:

For example, in a case where the reproducing light is irradiated so as to span the plurality of tracks as is in the second embodiment, the light intensity per unit area in an irradiated portion of the recording medium is reduced. Accordingly, the incident light intensity of the plurality of tracks to the light receiving element for focus error detection, which receives the reflected light from a portion of the irradiated portion, is also reduced, and an S/N is reduced. Over against this, since the recording light is not so irradiated as to span the plurality of tracks, the light intensity per unit area in the irradiated portion of the recording medium can increase (of course, the light intensity is maintained to a light intensity level which does not affect the recording medium at reproducing). Thus, the incident light intensity to the light receiving element for the focus error detection also increases, and the S/N also increases.

In connection with the above, the arrangement may be such that the above-described embodiments and the like are partially combined with each other to form different embodiments.

What is claimed is:

1. An optical information recording and reproducing apparatus comprising:

recording-light generating means for generating recording light which is used to record information onto an optical recording medium having a plurality of tracks;

reproducing-light generating means for generating reproducing light which is used to reproduce the information recorded onto said optical recording medium;

an objective optical system for condensing and irradiating said recording light generated by said recording-light generating means and said reproducing light generated by said reproducing-light generating means, to positions on the optical medium different from each other;

optical detecting means for receiving returned light of said recording light and returned light of said reproducing light condensed and irradiated to said optical recording medium, at positions different from each other;

light-intensity control means for performing such control that a light intensity of said recording light generated by said recording-light generating means during a period of time other than the time of recording which records the information onto said optical recording medium is set to a low light intensity in which a pit is not formed on said optical recording medium;

focus control means for controlling said reproducing light such that the size of an optical spot formed on said optical recording medium by said reproducing light is minimized;

focus detecting means for detecting a focus error signal which expresses a quantity of displacement from a focus condition in which the size of the optical spot formed on said optical recording medium by said recording light is minimized, and focus-error-signal hold means for holding a value of a focus error signal due to said recording light, said focus-error signal hold means being under control of said focus control means according to focus control of said reproducing light.

2. An optical information recording and reproducing apparatus according to claim 1, wherein said focus-error-signal hold means holds a value of said focus error signal immediately before a period of time of recording operation in which the information is recorded onto said optical recording medium.

3. An optical information recording and reproducing apparatus comprising:

recording-light generating means for generating recording light which is used to record information onto an optical recording medium having a plurality of tracks;

reproducing-light generating means for generating reproducing light which is used to reproduce the information recorded onto said optical recording medium;

an objective optical system for condensing and irradiating said recording light generated by said recording light generating means and said reproducing light generated by said reproducing-light generating means, to positions on the optical medium different from each other;

optical detecting means for receiving returned light of said recording light and returned light of said reproducing light condensed and irradiated to said optical recording medium, at positions different from each other;

light-intensity control means for performing such control that a light intensity of said recording light generated by said recording-light generating means during a period of time other than the time of recording which records the information onto said optical recording medium is set to a low light intensity in which a pit is not formed on said optical recording medium;

tracking control means for performing control such that an optical spot formed on said optical recording medium by said reproducing light is located at a center of each of said tracks;

tracking detecting means for detecting a tracking error signal which expresses a quantity of displacement from a tracking condition in which the optical spot formed on said optical recording medium by said recording light is located at the center of each of said tracks; and tracking-error-signal hold means for holding a value of a tracking error signal due to said recording light, said tracking-error-signal hold means being under control of said tracking control means according to tracking control of said reproducing light.

4. An optical information recording and reproducing apparatus according to claim 3, wherein said tracking-error-signal hold means holds a value of said tracking error signal immediately before a period of time of recording operation in which the information is recorded onto said optical recording medium.

* * * * *